US011593356B2

(12) United States Patent
Hogan

(10) Patent No.: US 11,593,356 B2
(45) Date of Patent: Feb. 28, 2023

(54) NEVER STALE CACHING OF EFFECTIVE PROPERTIES

(71) Applicant: ForgeRock, Inc., San Francisco, CA (US)

(72) Inventor: Dirk John Hogan, West Linn, OR (US)

(73) Assignee: ForgeRock, Inc., San Francisco, CA (US)

(*) Notice: Subject to any disclaimer, the term of this patent is extended or adjusted under 35 U.S.C. 154(b) by 43 days.

(21) Appl. No.: 17/018,074

(22) Filed: Sep. 11, 2020

(65) Prior Publication Data

US 2022/0083536 A1 Mar. 17, 2022

(51) Int. Cl.
| | |
|---|---|
| G06F 12/0875 | (2016.01) |
| G06F 16/23 | (2019.01) |
| G06F 16/901 | (2019.01) |
| G06Q 10/10 | (2012.01) |
| G06Q 10/105 | (2023.01) |
| G06Q 10/109 | (2023.01) |
| G06Q 10/06 | (2012.01) |
| G06Q 10/067 | (2023.01) |

(52) U.S. Cl.
CPC ...... G06F 16/2379 (2019.01); G06F 12/0875 (2013.01); G06F 16/9024 (2019.01); G06Q 10/105 (2013.01); G06Q 10/109 (2013.01); G06F 2212/1032 (2013.01); G06Q 10/067 (2013.01)

(58) Field of Classification Search
CPC ............. G06F 16/2379; G06F 16/9024; G06F 12/0875; G06F 2212/1032; G06Q 10/105; G06Q 10/109; G06Q 10/067

USPC ........................................................ 707/703
See application file for complete search history.

(56) References Cited

U.S. PATENT DOCUMENTS

| | | | | |
|---|---|---|---|---|
| 6,842,906 | B1* | 1/2005 | Bowman-Amuah | ... G06F 9/465 719/330 |
| 2003/0225886 | A1* | 12/2003 | Hogan | .......... G06F 9/466 709/224 |
| 2004/0088563 | A1 | 5/2004 | Hogan et al. | |
| 2005/0246700 | A1* | 11/2005 | Archambault | ........ G06F 8/4442 717/160 |
| 2007/0156966 | A1* | 7/2007 | Sundarrajan | ........ G06F 12/0808 711/E12.025 |
| 2014/0215001 | A1* | 7/2014 | Tucek | ................. H04L 67/5681 709/213 |
| 2014/0344520 | A1* | 11/2014 | Jenkins | .............. H04L 67/2885 711/118 |

(Continued)

FOREIGN PATENT DOCUMENTS

AU 2013304366 B2 * 5/2016 ....... G06F 16/24539

Primary Examiner — James Trujillo
Assistant Examiner — Antonio J Caiado
(74) Attorney, Agent, or Firm — Haynes Beffel & Wolfeld, LLP; Ernest J. Beffel, Jr.

(57) ABSTRACT

The technology disclosed relates to maintaining a cache of effective properties in an identity management system employing a graph. In particular, it relates to handling vertex/edge and/or graph topology updates in accordance with update notification requirements configured from a schema and, in conjunction with detecting updating of vertex/edge attributes and/or graph topology, recalculating effective attributes in accordance with the configured notification requirements.

24 Claims, 13 Drawing Sheets

(56) References Cited

U.S. PATENT DOCUMENTS

| | | | |
|---|---|---|---|
| 2015/0200974 A1* | 7/2015 | Pearce | H04L 65/1069 |
| | | | 709/203 |
| 2018/0167307 A1* | 6/2018 | Barry | H04L 45/18 |
| 2019/0075115 A1* | 3/2019 | Anderson | H04L 63/083 |
| 2020/0218658 A1* | 7/2020 | Pack | G06F 16/00 |
| 2021/0073288 A1* | 3/2021 | Hunter | G06N 3/0481 |
| 2021/0241206 A1* | 8/2021 | Choi | G06Q 10/063118 |
| 2021/0286479 A1* | 9/2021 | Boucher | G06F 40/205 |

* cited by examiner

```
0002:  "objects" : [
0004:    "name" : "user",        //vertex class
0005:    "onCreate" : {
0006:      "type" : "text/javascript",
                                                    183a
0009:    "onUpdate" : {
0010:      "type" : "text/javascript",
0013:    "postDelete" : {
0014:      "type" : "text/javascript",
0015:      "source" : "require('postDelete-idp-
cleanup').removeConnectedIdpData(oldObject, resourceName,
request);require('postDelete-notification-cleanup')
.removeConnectedNotificationData(oldObject, resourceName, request);"
0016:    },
0017:    "schema" : {
0358:      "roles" : {
0370:        "type" : "relationship",             //relationship-edge
0373:        "reverseRelationship" : true,
0374:        "reversePropertyName" : "members", //relationship-edge
0375:        "notifySelf" : true,
0382:        "_refProperties" : {
0383:          "description" : "Supports metadata in relationship",
0384:          "type" : "object",
0413:      "authzRoles" : {                      //relationship-edge
0414:        "description" : "Authorization Roles",
0415:        "_refProperties" : {
0436:          "description" : "Supports metadata in relationship",
0437:      "reports" : {                         //relationship-edge
0473:        "description" : "Direct Reports",
0474:      },
0475:      "effectiveRoles" : {                  //never stale cache
0522:        "type" : "array",
0523:        "title" : "Effective Roles",
0524:        "description" : "Effective Roles",
0525:        "viewable" : false,
0526:
0527:
```

```
0485:           "id" : "urn:jsonschema:org:forgerock:
                     openidm:managed:api:User:reports:items",
0486:           "title" : "Direct Reports Items",
0487:           "reverseRelationship" : true,
0488:           "reversePropertyName" : "manager"
0530:         "queryConfig" : {
0531:           "referencedRelationshipFields" : ["roles"]
0532:         },
0537:         "title" : "Effective Roles Items"
0539:       },
0540:       "effectiveAssignments" : {           //never stale cache
0541:         "type" : "array",
0542:         "title" : "Effective Assignments",
0543:         "description" : "Effective Assignments",
0544:         "viewable" : false,
0545:         "returnByDefault" : true,
0546:         "isVirtual" : true,
0547:         "queryConfig" : {
0548:           "referencedRelationshipFields" : ["roles", "assignments"],
0549:           "referencedObjectFields" : ["*"]
0707:       "lastSync" : {
0708:         "description" : "Last Sync timestamp",
0788:       "meta" : {
0789:         "property" : "_meta",
0790:         "resourceCollection" : "internal/usermeta"
0795:       },
0796:       "notifications" : {
0797:         "property" : "_notifications"
0799:       },
```

```
0983:             "condition" : {
0984:                 "description" : "A conditional filter for this role",
0987:                 "searchable" : false,
0988:                 "isConditional" : true,
0991:             "temporalConstraints" : {
0992:                 "description" : "An array of temporal constraints
1002:                 "duration" : {
```

```
1033:     "name" : "assignment",           //vertex class
1034:     "schema" : {
1075:         :
1076:         "attributes" : {
1110:             "notifyRelationships" : ["roles"],
1122:             "roles" : {                       //relationship-edge
1129:                 "type" : "relationship",
1132:                 "reverseRelationship" : true,
1133:                 "reversePropertyName" : "assignments",
1134:                 "validate" : true,
1135:                 "properties" : {
1136:                     "_ref" : {
1137:                         "description" : "References
1139:                     "refProperties" : {
1140:                         "description" : "Supports metadata
1141:                             within the relationship",
1152:                 "resourceCollection" : [
1154:                     "notify" : true,
1155:                     "path" : "managed/role",
1156:                     "label" : "Role",
1157:                     "query" : {
1158:                         "queryFilter" : "true",
1159:                         "fields" : [
1160:                             "name"
```

↑ 177c

183b

```
0801:     "name" : "role",                  //vertex class
0802:     "onDelete" : {
0803:         "type" : "text/javascript",
0804:         "file" : "roles/onDelete-roles.js"
0805:     },
0806:     "schema" : {
0836:         "members" : {                 //relationship-edge
0837:             "description" : "Role Members",
0838:             "title" : "Role Members",
0840:             "type" : "array",
0844:             "type" : "relationship",
0847:             "reverseRelationship" : true,
0848:             "reversePropertyName" : "roles",
0854:             "refProperties" : {
0855:                 "description" : "Supports metadata within
0856:                     the relationship",
0936:         "assignments" : {
0937:                                        //relationship-edge
0938:             "description" : "Managed Assignments",
0942:             "type" : "array",
0943:             "items" : {
0944:                 "type" : "relationship",
0945:                 "id" :
      "urn:jsonschema:org:forgerock:openidm:managed:
      api:Role:assignments:items",
0946:             "title" : "Managed Assignments Items",
0947:             "reverseRelationship" : true, //relationship-edge
0872:         "resourceCollection" : [
0873:             :
0874:             "notify" : true,
0875:             "conditionalAssociation" : true,
0876:             "path" : "managed/user",
0981:     "notifyRelationships" : ["members"]
0982: },
```

```
0002: "objects": [
0003:   {
0004:     "name": "user",
0414:     "authzRoles": {
0461:       "path": "managed/role",        //relationship edge
0462:       "label": "Role",
0463:       "conditionalAssociationField": "condition",
0464:       "query": {
0465:         "queryFilter": "true",
0466:         "fields": [
0467:           "name"
0473:     },
0474:     "reports": {
0475:       "description": "Direct Reports",
0476:       "title": "Direct Reports",
0479:       "type": "array",
0484:       "type": "relationship",
0485:       "id": "urn:jsonschema:org:forgerock:openidm:
              managed:api:User:reports:items",
0486:       "title": "Direct Reports Items",
0487:       "reverseRelationship": true,    //relationship edge
0488:       "reversePropertyName": "manager",
0490:       "properties": {
0491:         "_ref": {
0492:           "description": "References a relationship from managed
              object",
0493:           "type": "string"
0494:         },
0495:         "_refProperties": {
0496:           "description": "Supports metadata within relationship",
0497:           "type": "object",
0498:           "title": "Direct Reports Items _refProperties",
0499:           "properties": {
0500:             "_id": {
0501:               "description": "_refProperties object ID",
0502:               "type": "string"
0507:       "resourceCollection": [
0508:         {
0509:           "path": "managed/user",
0510:           "label": "User",
0511:           "query": {
0512:             "queryFilter": "true",
0513:             "fields": [
0663:     "manager": {                       //relationship edge
0664:       "type": "relationship",
0666:       "reverseRelationship": true,
0667:       "reversePropertyName": "reports",
0668:       "description": "Manager",
0669:       "title": "Manager",
0674:       "properties": {
0675:         "_ref": {
0678:         },
0679:         "_refProperties": {
0680:           "description": "Supports metadata
              within the relationship",
0681:           "type": "object",
0682:           "title": "Manager _refProperties",
0683:           "properties": {
0684:             "_id": {
0690:       },
0691:       "resourceCollection": [
0692:         {
0693:           "path": "managed/user",
0694:           "label": "User",
0695:           "query": {
0696:             "queryFilter": "true",
0697:             "fields": [
0698:               "userName",
0699:               "givenName",
```

1000a

1000b

NEVER STALE CACHING OF EFFECTIVE PROPERTIES

FIELD OF THE TECHNOLOGY DISCLOSED

The technology disclosed relates generally to maintaining a cache of graph properties. It can be used in conjunction with identity management as well as other graph management applications. In particular, it relates to calculating properties derived from graph vertex state, which are harvested by traversing specified graph edges, upon graph topology changes. The specific nature of graph topology changes triggering property calculation can be configured to signal when selected graph edges, or selected graph vertex attributes, change. This allows these calculated properties to encapsulate state relating to a connected graph topology, effectively constituting a cache of desired graph topology state, which is recalculated only when specified graph topology changes are made.

BRIEF DESCRIPTION OF THE DRAWINGS

In the drawings, like reference characters generally refer to like parts throughout the different views. The drawings are not to scale, with an emphasis instead generally being placed upon illustrating the principles of the technology disclosed. Likewise, any computer code excerpts from more extensive schema or program are provided for the purpose of illustration and are merely examples. In the following description, various implementations of the technology disclosed are described with reference to the following drawings.

FIG. 4A excerpts lines of code from a schema from which the example graph of FIG. 3 is implemented.

FIG. 4B is a continuation of the FIG. 4A schema excerpts.

FIG. 5B excerpts lines of code from a schema from which the example graph of FIG. 5A is implemented.

DETAILED DESCRIPTION

Figure 1:
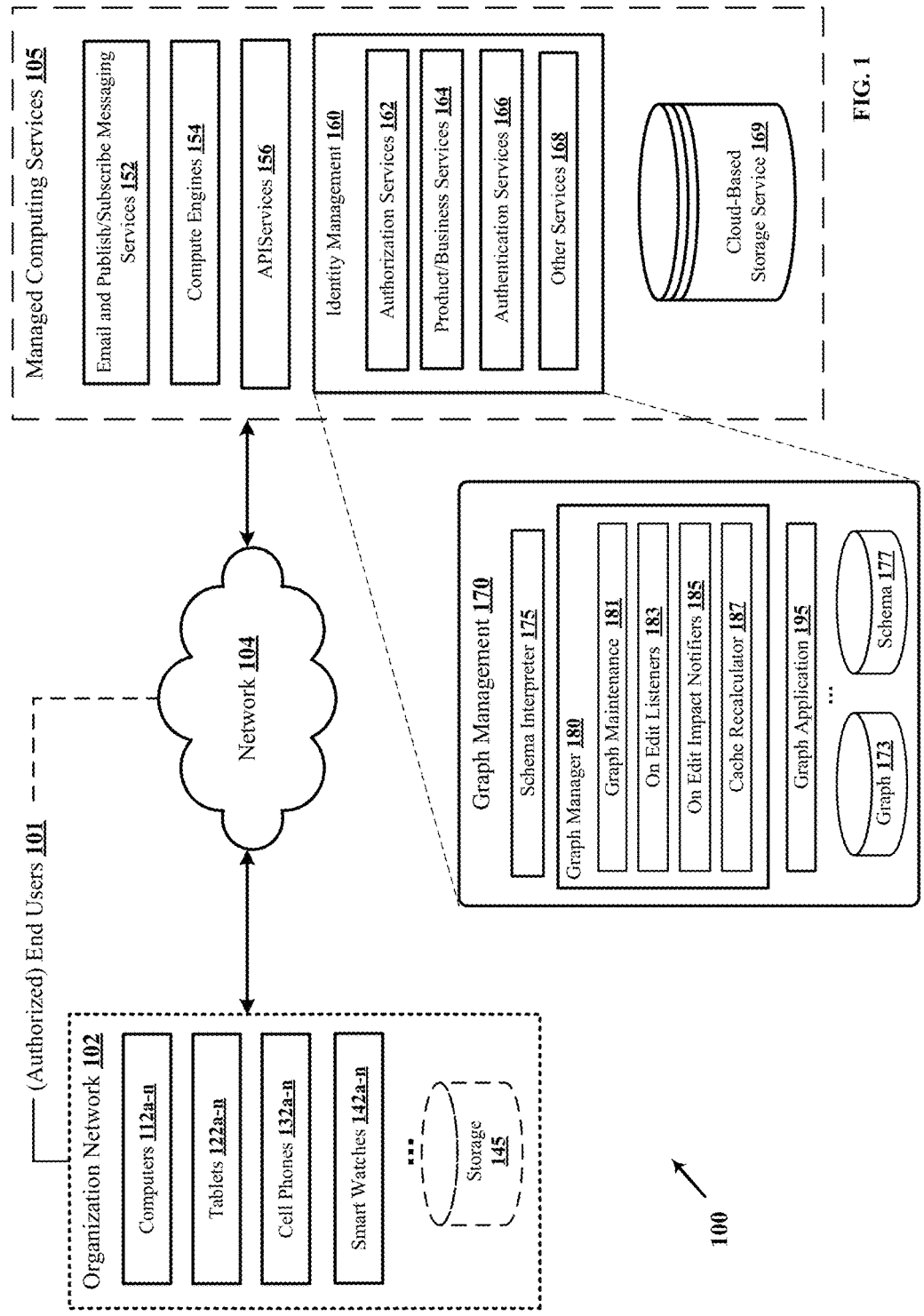
FIG. 1 is an architectural level block diagram of a system utilizing never stale caching of effective properties.

The following detailed description is made with reference to the figures. Example implementations are described to illustrate the technology disclosed, not to limit its scope, which is defined by the claims. Those of ordinary skill in the art will recognize a variety of equivalent variations on the description that follows.

Identity management is a broad term for relating identities in a given business domain: users, customers, employees—principals—and the related resources whose connectivity constitute the semantics of a given business domain. Practicing the technology disclosed, the principals and related resources are graph nodes or vertices and the relationships are graph edges. The graph topology is an expression of business domain semantics. For example, employee vertices might have role edges to role vertices, which, in turn, have assignment edges which connect a set of assignment vertices to each role, thereby conveying certain authorization attributes to the employees. The employee vertex is said to harvest authorization attributes from connected assignment vertices, connected via roles. Or account vertices could have vehicle edges to the vehicles associated with the account, which, in turn, could have device edges to the devices associated with each vehicle, which might, in turn, have owner edges identifying the users which own these devices. The graph topology is a flexible, completely customizable expression of a given business domain.

A problem was recognized with using graphs to express assignments (which imply state used to make authorization decisions) available to users through roles from assignments. A user can have multiple roles, and each role can have multiple assignments. Users can have hundreds of roles, and each role can have scores of assignments. A given customer deployment can have millions of users. Assignments are accumulated across a user's roles, and the resources that they can access are identified by a union of their assignments. This is the application of identity management graphs from which a problem was recognized.

Each time a person logged into the identity management structure, their assignments needed to be recalculated so that authorization decisions could be correctly made. This was implemented by join queries against a relational database. However, even with a modest database of tens of thousands users, the query load was high and taxing on system resources, preventing the system from scaling to millions of users. In this use case, assignments were being queried more often than they were being updated, so efficient querying was a priority. Recognizing the problem of reducing the load for evaluating assignments and, more generally, allowing a given vertex to encapsulate state corresponding a distant vertex in the connected graph topology, without having to frequently traverse this graph topology, led to development of the technology disclosed.

The technology disclosed can be viewed at several levels: graph processing; implementation models; and runtime adaptation.

Generally, at the level of graph processing, the technology disclosed includes ordered categories of nodes. Root nodes harvest attributes from leaf nodes by traversing edges that connect the ordered node categories. While nodes in the graph are fully interconnected, ordering rules render traversal of the graph acyclic. The technology disclosed is most useful for systems with relatively frequent queries for attributes harvested by the root nodes and infrequent updating of leaf node attributes and of edges between root or higher order nodes and leaf or lower order nodes. The technology disclosed includes never-stale caching of harvested attributes and notification of updates that require refreshing the never-stale caches.

One example implementation of the technology disclosed uses object-oriented classes of vertices and RESTful endpoints that listen for updates to edges, referred to as relationships, and to attributes of leaf nodes, referred to as vertices. The REST endpoints listen for updates to attributes and graph topology that impact harvesting attributes by a higher level class of vertex objects from a lower level class of vertex objects. Classes are constructed from a schema. Ordering for traversal among classes is explicit in the example schema, but could, in some limited implementations, be inferred from an order in which classes are defined in the schema. Relationships can be cached in vertices of all categories, so edges are not separate objects.

A second example implementation could be built on a database that stores ordered categories of nodes in tables and edges in linking tables. The categories of nodes can have different attributes. High-level nodes have effective attributes harvested from low-level nodes. Harvesting proceeds according to an ordering among the categories and to connections by edges from the high-level nodes to the low-level nodes. In this example, a table caches the harvested attributes. The cache table is refreshed as low-level nodes and edges between high and low level nodes are updated. Cache table refreshes can be queued or can be performed synchronously as updates occur.

Yet another example implementation could use a graph database to implement the nodes and edges. High-level nodes cache the attributes they harvest from low-level nodes. These caches are refreshed due to changes in topology and attributes of low level nodes. As in the preceding example, cache table refreshes can be queued or can be performed synchronously as updates occur.

By runtime adaptation, reliance on the schema for attributes to cache and, potentially, for notification instructions can be lessened. This is possible when harvesting is defined in the schema for an origin category of vertices and the attributes harvested are based on actual presence of data in certain graph objects or database tables. For instance, if the categories are users, roles and assignments, the user nodes can traverse roles to harvest attributes from the assignment nodes. The attributes to be harvested can be all of the populated attributes in the assignment nodes. Notifications can be explicit in the schema or could be triggered by changes in any edge that connects user nodes to assignment nodes to be harvested, through the role nodes. Notifications also can be triggered by changes in attributes of the bottom level, assignment nodes. The system can compose both attributes to cache and these notification patterns from harvesting defined in the schema combined with data found in the bottom level nodes.

These alternative implementations realize a never stale cache of assignments. Instead of recalculating assignments upon login, changes to properties in the graph and topology (vertices and edges) of the graph are used to trigger refreshes to caches in certain vertices. In the listener implementation, at least one endpoint, such as a REST endpoint, can be notified of changes and refresh caches as needed. In other database implementations, a queue of vertices to be refreshed could be maintained and serviced by a worker. Or a refresh routine could be invoked directly when a vertex needs to be refreshed. For convenience, this disclosure will most often refer to notifying a vertex that requires a cache refresh. The reader should understand that each such description is inclusive of the alternatives of queuing or directly invoking a refresh.

In a user-role-assignment use case, a change in assignment properties which determine authorization state impacts an identifiable group of users, namely those users who have the roles associated with the assignment whose authorization state was changed. In this case, notification is propagated from this updated assignment, to all connected roles, and from there, to all connected users. Upon receipt of this notification, listeners for the user vertices traverse their roles, and from each role, their assignments, and refresh their cache with current assignment state. A change in any of the edges connecting users to roles, and roles to assignments, will similarly be propagated across the graph topology to all connected users, triggering cache refreshes.

The technology disclosed includes configuring conditions that lead to cache refreshes, directions for update-triggered notification to vertices that require a cache recalculation, and executing the refresh of cached state derived from connected graph topology. The technology disclosed configures update triggers from a schema that describes classes of vertices and edges. Classes of edges connect classes of vertices, which together constitute a graph topology, from which notification to vertices to be refreshed follows. Traversing in the opposite direction, the schema for classes of edges that connect classes of vertices also describes how to refresh the cached graph topology properties of a vertex, upon change notification receipt. All of the triggers, the notification requirements, and the recalculation queries can be configured from the schema. Thus, the technology disclosed is broadly applicable to many sorts of identity management and even other graphs, extending beyond the first use case of never stale caching of a user's assignments or states for authorization.

FIG. 1 is a high-level block diagram of an example system that uses the technology disclosed. As a high-level diagram, some components are omitted to emphasize innovative features of the technology disclosed.

System 100 includes an organization network 102 of a business or other organization with computers 112a-n that provide end user access to resources provided by managed computing services 105, or further, to resources provided by organization network 102 and/or other services from providers external to managed computing services (not shown). End users 101 can include local or remote end users seeking to access resources via ones of computers 112a-n, tablets 122a-n, cell phones 132a-n, smart watches 142a-n, and/or virtual/augmented reality (not shown) and/or other computing devices. Browser-based applications can, for example, be used by such computing devices alone or in combination to communicate via network 104 with managed computing services 105. Browser-based applications can, for example, be delivered to these and/or other devices not mentioned here by managed computing services 105, and can utilize security and/or other protocols in accordance with the requirements of a particular application. Network 104 can, for instance, include private networks and/or public networks such as the Internet.

Managed computing services 105 include cloud-based managed services provided by a managed services provider that is trusted third party with respect to organization network 102. Managed services 105 include identity management 160. Identity management 160 can include managed services for identifying, authenticating and/or authorizing individuals or groups of users in conjunction with providing them access to applications, systems, networks, storage and/or other services. As shown, identity management 170 includes authorization services 162, a subset of which are used as examples for conveying an understanding of various aspects of the invention, beginning with FIG. 3. Identity management 170 can also include product/business services 164, authentication services 166, storage services 169 and/or other managed services 168. It will become apparent that identity management according to the invention has broad application for relating users and resources. Identity management can include one or more, or even all of the illustrated and/or other managed computing services, or can be utilized in conjunction with ones of managed computing services. Managed computing services 105 also include email and publish/subscribe services 152, compute engines 154, application program interface or API services 156 and cloud-based storage services 169, and may further include other services. Such services can, for example, include but are not limited to business process services, graph management services 170, and other services relating to the operations, implementations, transactions and/or other interactions of individuals/groups, businesses, products/services, and so on. Managed computing services 105 can provide all or a portion of such services directly. Managed computing services 105 can also act as an intermediary, conducting identity management 160 for services provided by organization network 102 and/or other service providers (not shown) that can, for example, be coupled to managed computing services 105 via network 104 for providing such services.

Graph management supports utilizing a graph, for example, in conjunction with identity management or identity management related services. Graph management can include but is not limited to designing, creating, changing, replacing and/or other aspects of graph management, in addition to the examples specifically provided. Graph management can, for example, be utilized for individual/collaborative end user creation, customization and/or adaptation of graphs, schema, related programs/designs and/or analyses, entry of updates to the graphs, and so on.

Graph management 170 provides for configuring, from a schema, structures and maintenance methods for calculating effective attributes, refreshing never stale caches, etc., which can be used in conjunction with identity management and other graphs. Maintenance includes configuring notification requirements applicable to the updating of attributes of vertices in an identity management or other graph, and to the updating of topology of the graph by adding or deleting vertices and/or edges in the graph. Graph management 170 also provides for detecting an update to an attribute or topology that is subject to a configured notification requirement, and for refreshing vertices in a class of vertices that is subject to the configured notification requirement and connected in the graph by one or more edges and vertices to the updated vertex or edge. Graph management 170 includes schema interpreter 175, graph manager 180 and graph application 195, as well as a graph 173 with one or more never stale caches, and schema 177. Graph manager 180 further includes graph maintenance 181, on edit listeners 183, on edit impact notifiers 185 and a cache recalculator 195, which are described in greater detail beginning with FIG. 2.

In the interconnection of the elements of system 100, network 104 couples computers 112*a-n*, tablets 122*a-n*, cell phones 132*a-n*, smart watches 142*a-n*, organization network 102, authorization server 105 and resource server 148 in communication. The communication path can be point-to-point over public and/or private networks. Communication can occur over a variety of networks, e.g. private networks, VPN, MPLS circuit, or Internet, and can use appropriate application program interfaces (APIs) and data interchange formats, e.g. REST, JSON, XML, SOAP. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network and/or Internet, inclusive of the mobile Internet, via protocols such as EDGE, 3G, 4G LTE, Wi-Fi, and WiMAX.

Figure 2:
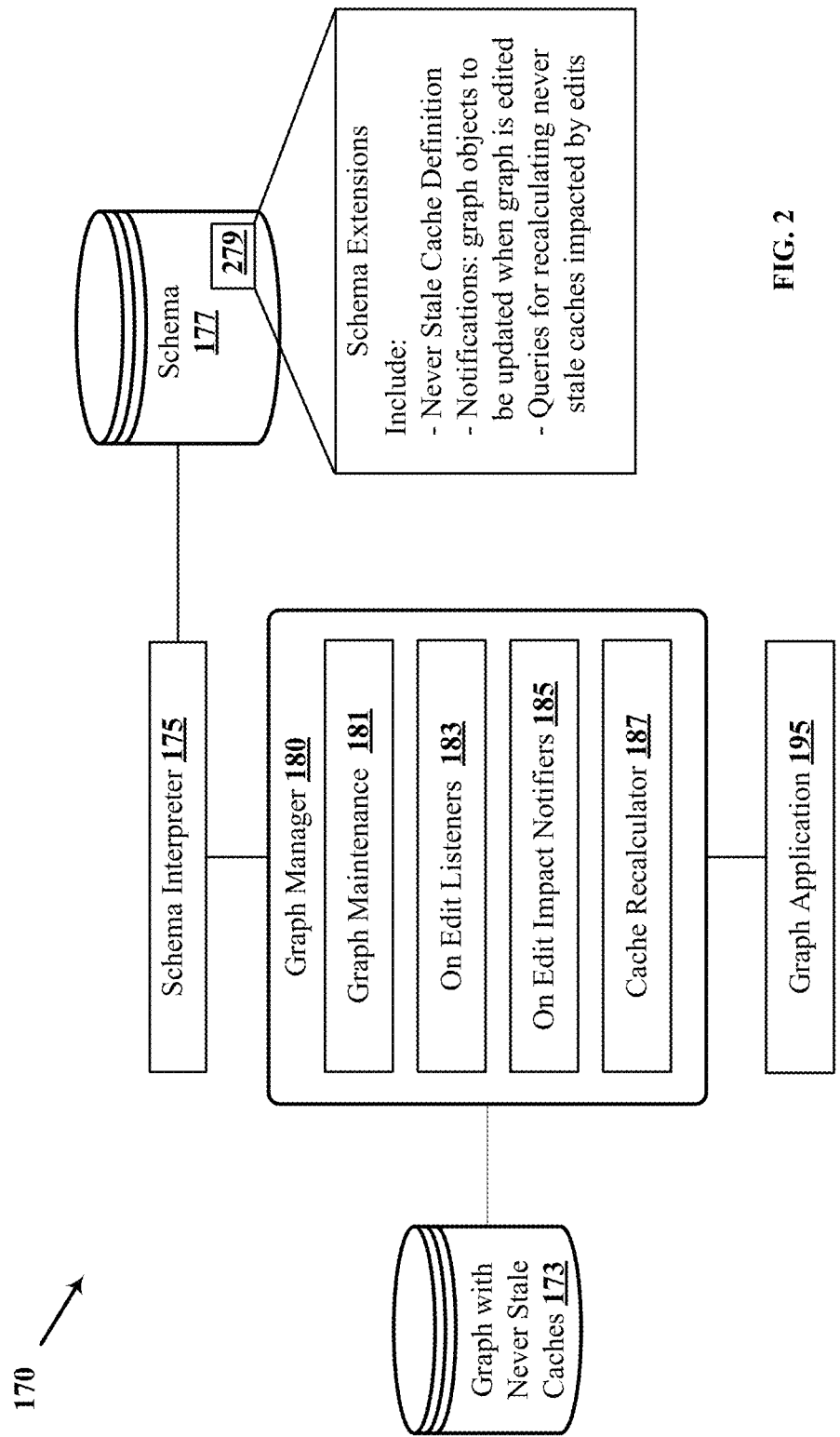
FIG. 2 illustrates a graph management system of FIG. 1 in greater detail.

FIG. 2 illustrates graph management 170 of FIG. 1 in greater detail. Schema 177 defines a graph 173 and operations on graph 173. Graph 173 includes never stale caches in all vertices in a class of vertices. A never stale cache allows lookup of vertex properties that are derived from vertex state in the connected graph topology. For instance, a never stale cache can be maintained at a user vertex, such that, in a user-role-assignment use case, queries for user assignment state can be looked up in the never stale cache, and without navigating the graph topology. In other cases, never stale caches can be maintained at vertices in any given vertex class, thereby providing similar query optimizations in accordance with the requirements of a particular application.

Figure 5A:
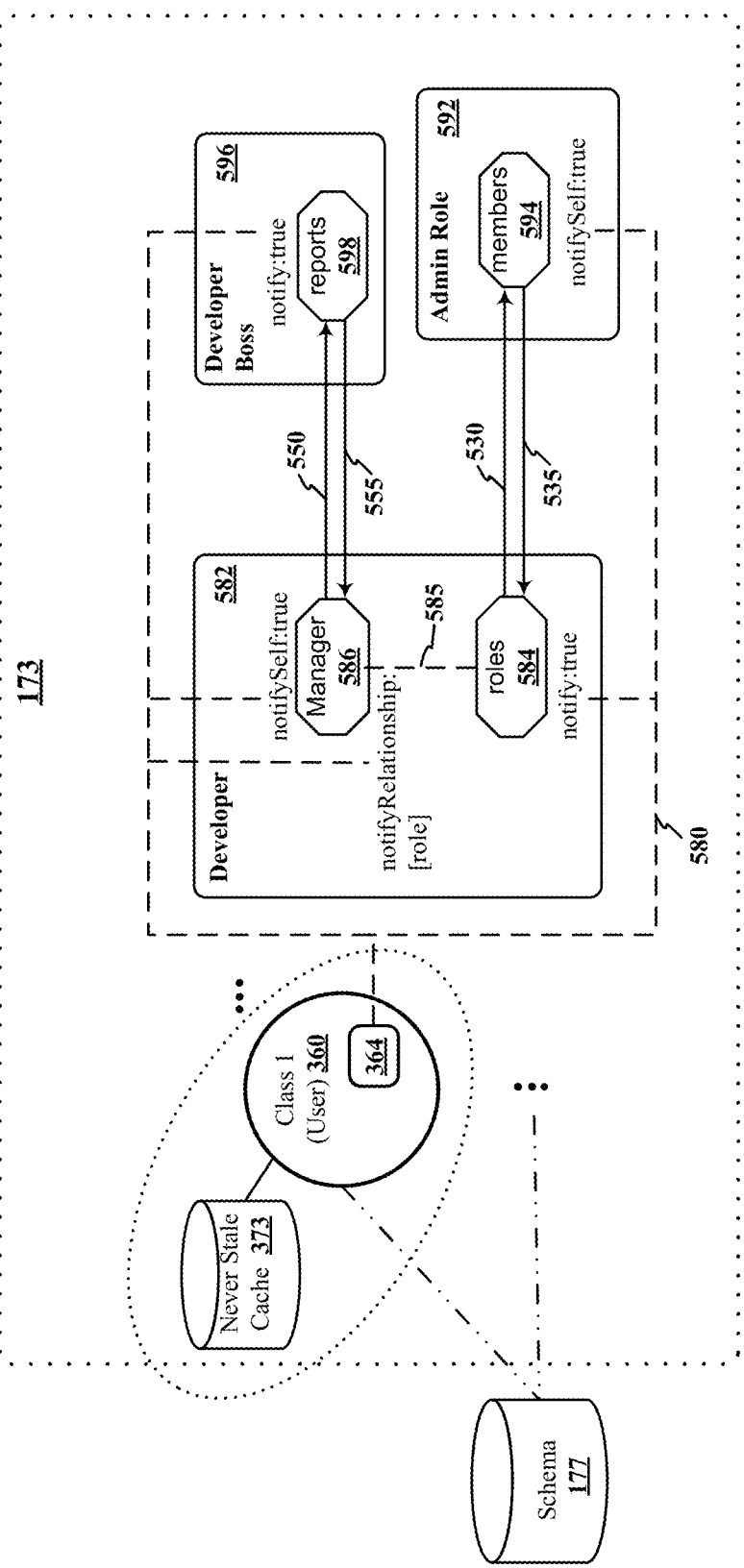
FIG. 5A illustrates a portion of a further example graph that tracks reporting relationships within an organization.
Figure 6:
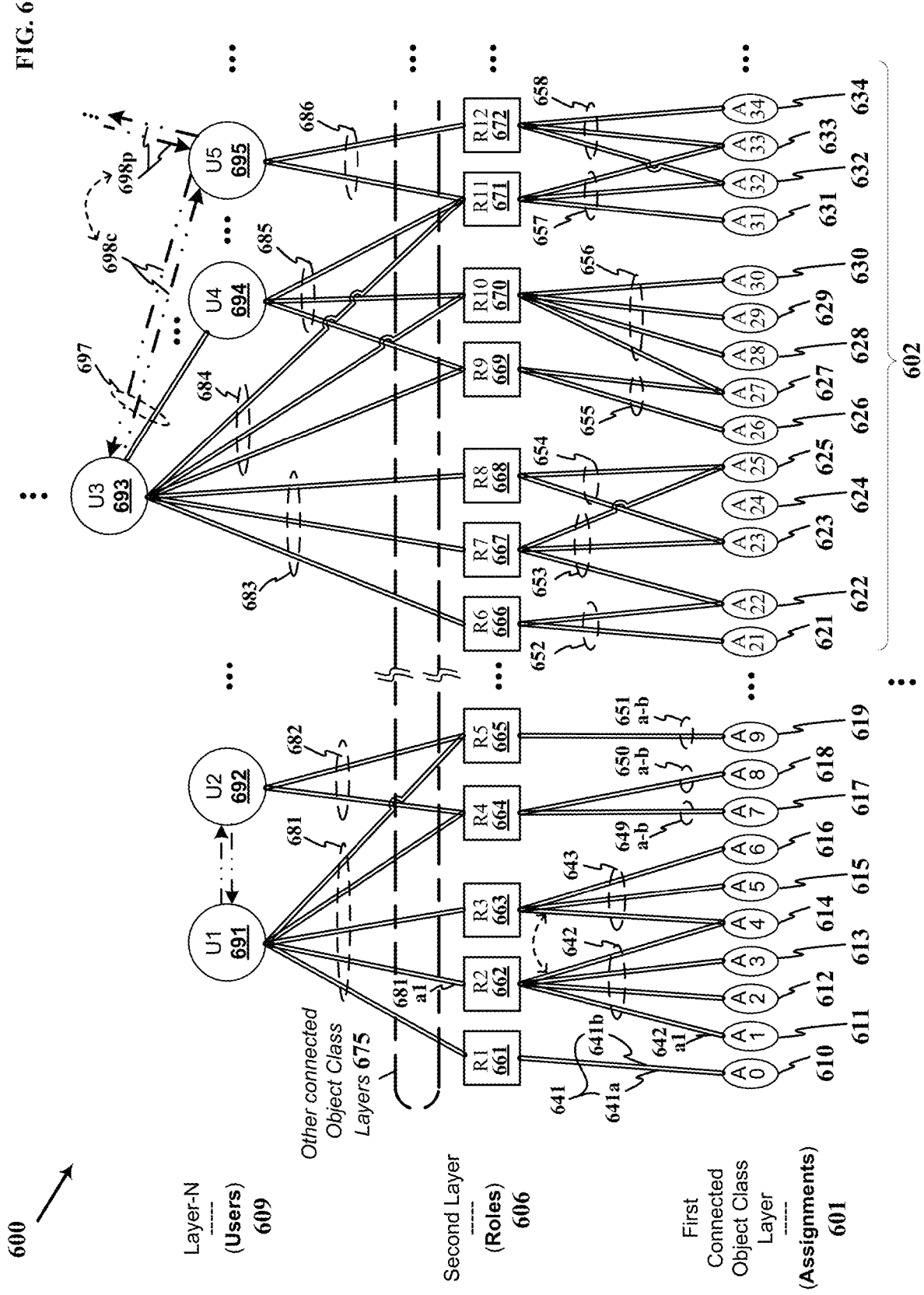
FIG. 6 shows an example graph example in a user-role-assignment use case.

Schema 177 is extended beyond a typical schema to include definition of the never stale cache, so-called notifications of graph objects to be refreshed when the graph is edited, and queries for recalculating the never stale caches that are impacted by edits. Schema 177 is further described in the context an example graph in FIG. 3 and example schema excerpts in FIGS. 4A and 4B for identity management of users, roles that the users have, and assignments that indicate permissions assigned to the roles. The primary use case that runs through these figures is part of an identity management graph with vertices or nodes for users, roles and assignments, but the technology disclosed is also generically described for application to other use cases. FIGS. 5A and 5B present a further example identity graph and example schema excerpts illustrating an alternative use case overlaid on the identity management graph of FIG. 3 and schema of FIGS. 4A and 4B to track reporting relationships within an organization. FIG. 6 illustrates how graph management 170 also provides for refreshing effective attributes and maintaining a never stale cache in conjunction with and further utilizing additional graph customizability, and other use case examples employing graph management 170 in conjunction with various graphs and graph utilizations are also provided.

Figure 3:
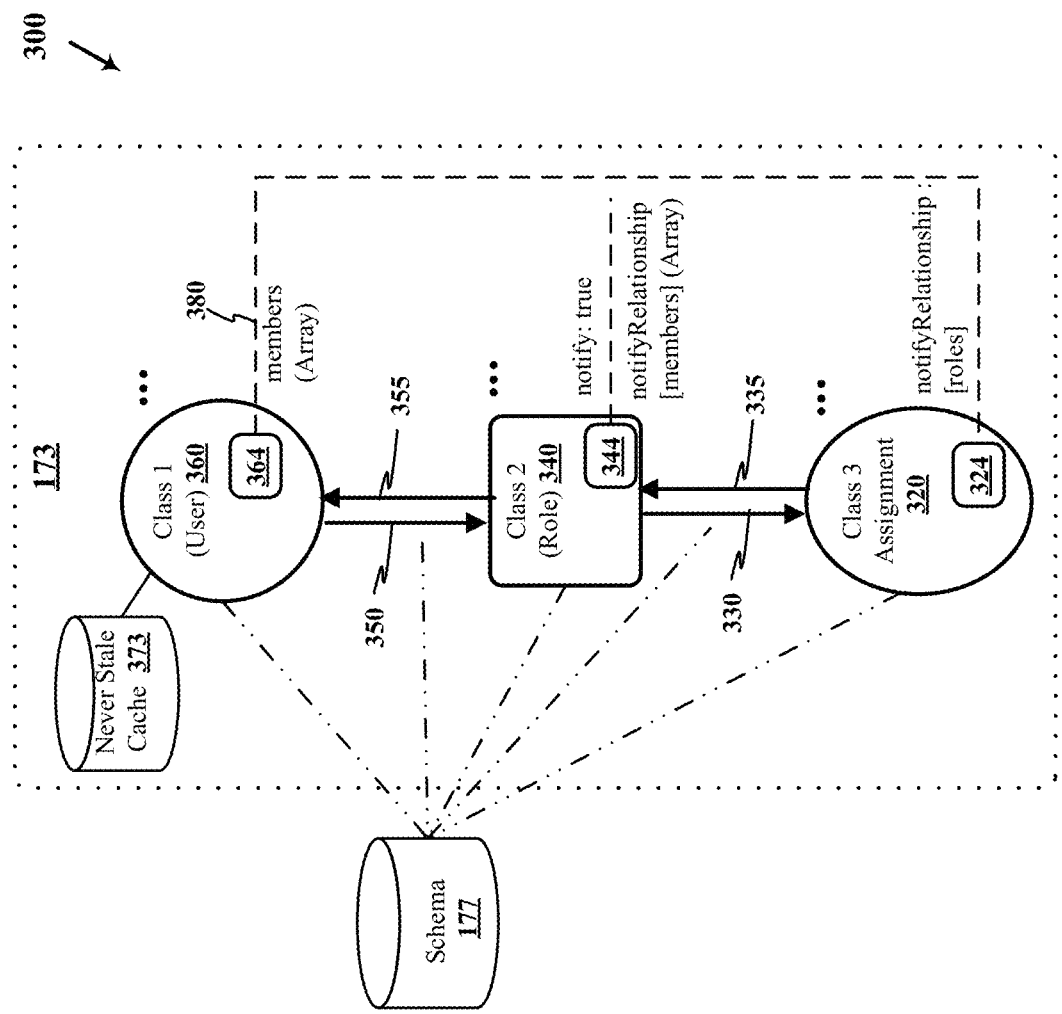
FIG. 3 is an example graph of vertices or nodes and edges or relationships that connect the vertices, in a user-role-assignment use case.

Example graph 173 of FIG. 3, for example, includes vertices or nodes, and edges or relationships, which connect the vertices in the user-role-assignment use case. The vertices and edges are collectively referred to as objects. Objects in graph 173 include vertices 320, 340 and 360, and edges 330, 335, 350 and 355. Attributes or properties can be loaded on any of these vertex or edge objects, and never stale caches can be maintained on any of the objects. One use case has the never stale caches on user vertices. More than one never stale cache can be maintained at a user vertex, such as for roles and assignments, as explained in the discussion below of an example schema. Never stale caches can be maintained at any vertex class, and are ultimately defined by the relationship fields traversed from the cache host vertex to reach the vertices whose properties will populate the never stale cache. Vertices are defined as a specific object class, and this definition includes the relationship fields which define the edges which link to other (or the same) vertex classes. The schema includes notification configurations, which dictate how edge or vertex property updates are propagated across the graph. This allows specific graph topology changes to be signaled across this graph topology to vertex classes affected by these topology changes. Signal receipt is used to traverse this same graph topology, generally in the direction opposite to signal propagation, to traverse the vertex instances whose state will populate the never-stale caches on the notified vertex instances. As applied to a user-role-assignment use case of identity management, for example, users can have associated roles and roles can have associated assignments or permissions. Users define two never-stale caches corresponding to the roles and assignments connected-to a given user: effectiveRoles and effectiveAssignments, respectively. Both the effectiveRoles and effectiveAssignments properties are populated by traversing the roles and assignments linked to a given user, a traversal which occurs only when this connected graph topology changes.

In one IDM implementation, the schema definitions configure numerous classes generally related to graph vertices and graph edges. In IDM parlance, graph vertices are called managed objects. One of the primary concerns of IDM is to be able to model a given customer's business domain, which is effectively done as the object types and corresponding relationships defined the schema. This state is used to instantiate the numerous classes that ultimately expose a corresponding REST endpoints, which are used to manipulate the vertices and edges in this graph. Part of this manipulation involves notification by signal generation and propagation, and signal receipt triggers recalculation of the vertex properties encapsulating selected elements of graph topology state—e.g. effectiveRoles and effectiveAssignments.

Returning to FIG. 2, schema interpreter 175 interprets schema 177 according to schema elements and configures data used by other components of the graph manager 180, including graph maintenance 181 and one or more on-edit listeners 183, edit impact notifiers 185 and cache recalculator 187, and by graph application 195. Schema interpreter 175 identifies objects or classes of objects that have never stale caches and assembles data used to build and maintain those caches. For on-edit listeners 183, schema interpreter identifies classes of objects for which notifications are triggered or otherwise required upon editing of attributes or topology. For edit impact notifiers 185, the schema interpreter identifies the class(es) of edges to trace and the class(es) of edges to which they connect, in order to determine which never stale caches should be refreshed due to user updates that update object attributes or add or delete object of the graph. Edit impact notifiers 185 compile lists of objects for which respective never stale caches will be refreshed or evaluated for refreshing, and provides for notifying impacted objects to refresh their caches. For cache recalculator 187, the schema interpreter provides data from the schema regarding how to traverse the graph and what attributes to accumulate in order to recalculate the never stale cache. For instance, for user vertices, schema interpreter 175 provides data from the schema that indicates how to traverse roles and how to traverse from roles to assignments in order to calculate effective roles and effective assignments stored in never stale caches of the user vertices. More generally, the schema interpreter can configure, from the schema, the data used to build a graph, maintain the graph and refresh never stable caches in graph objects, not limited to identity management.

Graph application 195 queries the graph for effective attributes that can be stored in and looked up from the never stale caches. In the use case of an identity management graph with users, roles and assignments, the identity management graph application queries a user vertex for effective assignments. The query can be answered via lookup in the never stale cache, without needing to navigate the graph and without needing to join roles and assignments in order to calculate effective assignments of the user. Because the never stale cache is refreshed when edits take place and are detected by graph management 170, for instance, when an on-edit listener 183 is triggered, the requested effective attributes can be looked up without the latency or resource demand associated with graph navigation or join queries.

FIG. 3 is a high-level block diagram of object classes in an example identity management graph 173. The vertices are organized in classes including users, roles and assignments (i.e., in a user-role-assignment use case). There will typically be many users. A user can also have several roles and multiple assignments can be associated with any role. Roles can also be shared by more than one user and assignments can be related to more than one role. Such an organization of multiple graph objects per object class can be more easily seen in graph 600 of FIGS. 6-7. Graph 600 depicts layers by classes of user vertices U1-5 691-5, role vertices R1-12 661-72 and assignment vertices A0-34 610-34. User vertex U1 691 has five roles R1-R5 (661-5). Two of these roles, R4 and R5 (664-5), are shared by user vertices U1 and U2 (691-2) and another two of the role vertices, R2 and R3 (662-3) are similarly both associated (or "share an association") with assignment vertex A4 614. A redundant path exists connecting A4 via role vertex R3 to U1. If an update deleted the edge from A4 to role vertex R2, or from A4 via R2 to U1, if the update instead deleted the edge from A4 to R3 (as shown by a dashed open arrow), one path would remain and A4 would still be connected to U1.

Relationships in FIGS. 3 and 6 are unidirectional and paired, though they could be implemented as bi-directional relationships. In the paired relationships, one relationship pair connects a pair of vertices along forward and reverse edges, such that the relationship pair can be traversed each direction along respective edges. User vertex 360 is associated by a "roles" edge 350 with role vertex 340, and by a reverse "members" edge 355 from role vertex 340 to user vertex 360. Role vertex 340 is further associated by an "assignments" edge 330, from role vertex 340 to assignment vertex 320, and by a reverse "roles" edge 335.

(As often happens in programming, some terms are overloaded. In this description, variations on "role" refer to an aspect of a user's job, a class of vertices, instances of a vertex, two classes of edges, and instances of both classes of edges. We have endeavored to distinctively identify what sense of role, for instance, we are referring to, but a skilled user may find some transgressions in the description.)

Continuing the description of FIG. 3, instances of the user class of vertices are connected by edges to instances of the role class of vertices that are connected in turn to instances of the assignment class of vertices. No direct connections between user vertices and assignment vertices are supported in the example schema. The schema specifies that user vertex 360 maintains never stale cache 373. The schema interpreter 180 parses the schema and assembles data used to build and maintain cache 373. Example notification requirements 380 specify a direction of notifications from assignment class 320 to the role class 340 and on to the user class 360, which will now be discussed in greater detail.

FIGS. 4A and 4B include schema excerpts used to specify objects illustrated in graph 300 of FIG. 3. FIG. 4A includes schema excerpts (177a) for user vertex 360 and relationships corresponding to user vertex 360, while FIG. 4B includes schema excepts (177b and 177c) respectively for role vertex 340 and relationships to role vertex 340, and for assignment vertex 320 and relationships corresponding to assignment vertex 320. Features of schema 177a-c including these components and the configuration of these components are configured by schema interpreter 175 and utilized by graph manager 180 and graph application 195 in the manners described herein to conduct graph management.

The schema for user vertex 360 begins at line 0017. Throughout the schema, edges are referred to as relationships, so we switch from edges to relationships for this discussion. In the user vertex section of the schema, the role relationship is specified beginning at line 0358. In the role vertex section of the schema, the assignment relationship is specified beginning at line 0937. The specifications of never stale caches for effective roles and effective assignments begin at 0523 and 0540. The query for refreshing the never stale cache of effective roles begins at 0530 and the query for refreshing effective assignments begins at line 0547. The "role" relationship 350, described as "Provisioning Roles", begins at 0358-60 and paired reverse "members" relationship 355 is identified at line 0374.

Specification of the role vertex, not to be confused with the roles relationship, begins at line 0801 of FIG. 4B. The schema for the role vertex 340 begins at line 0806, for which "Members" relationship 355, which is described as "Role Members", begins at lines 0836-38, and the paired reverse "roles" relationship 350 is identified at line 0848. "Assignments" relationship 330, which is described as "Managed Assignments", begins at lines 0937-38. The schema for the role vertex specifies that a modification to or received on the assignment relationship field (lines 0937 to 0982) triggers a notification along a "members" relationship field. The data type in the example schema for this relationship field is an array. This array or edge container can be implemented in a table or a variable size object. In some special cases, the relationship can be 1-to-1 instead of 1-to-n, which could be implemented in an array or as a single value.

The assignment vertex (177c) section of the schema begins at 1033 and attributes of the assignment begin at line 1076. "Roles" relationship 335, which is described as "Managed Roles" begins at line 1122 and the paired reverse "assignments" relationship is identified at line 1132. The schema specifies that a change in assignment attributes (at line 1076) triggers a notification along the "roles" relationship field, at line 1110.

Specification of notifications in this and a further example include "notify", "notifyRelationships" and "notifySelf" properties. Generally, notify and notifySelf specify whether objects that reference relationships are notified of a relationship change. In this example, IDM exposes a REST API. The edges between vertices are also exposed via this API. So doing a POST against managed/user/FRED/roles with a payload of {"ref": "managed/role/admin"} will create an edge between the FRED (which is in upper case for ease of reading, not as normal syntax) managed user and the admin managed role. Likewise, a POST against managed/role/admin/members with a payload of {"ref": "managed/user/FRED"} achieves exactly the same thing as the previous POST: it creates an edge between managed/user/FRED and managed/role/admin. In these example cases, we propagate signals back towards managed users, as they aggregate the effectiveRoles and effectiveAssignments properties, the state used to determine authorization decisions. This is achieved by the notifySelf and notify configurations. The notifySelf on the roles field of the managed user (0375) ensure that when the managed/user/ZZZ/roles endpoint receives a create/delete/update request, the managed user ZZZ will be told. The notify on the members field of the roles vertex (0874) ensures that when the managed/role/YYY/members endpoint is hit with a create/delete/update request, the managed user referenced in the request will be notified. In this way, we propagate signals from roles to users, not the other way round. We do this because users need to be told when their role state changes, as authorization state is derived from the referenced roles. But roles don't need to be told when their user state changes, in this example, as there is no property in the role vertex derived from the referenced users.

The next piece of this signal propagation is the "notifyRelationships[members]" at line 981 on the assignments relationship field on the roles vertex definition. This means that when the assignments relationship field on a role vertex is signaled (due to a change on the attributes of a referenced assignment, or because an edge has been created, or an existing edge has been deleted or updated), then this signal is propagated out of the members relationship field. In this way, any signal a role vertex field gets via its assignments relationship field (again because a new edge to an assignment has been created, an existing edge is deleted/updated, or the attribute state of a referenced assignment is changed) will be propagated on to all user vertices which are members of this role. Specification of "notifyRelationship": ["roles"] at line 1110 of assignment 320 means that a change to an attribute field (update/add/delete) of an assignment vertex will trigger an update notification to propagate along instances of the roles relationship (including edge 335 of FIG. 3) from assignment vertex 320 to role vertex 340. Members at line 0836, described as "role members" in line 0837 corresponds with members at line 0374 of user vertex schema 177a (FIG. 4A). This means that notification of the attribute field change will propagate along instances of the members relationship (including edge 355 of FIG. 3) from roles vertex 340 to user vertex 360. Specification of "notifyRelationship": true (line 0847) means that a change to an attribute field of a role vertex will also trigger an update notification to propagate along instances of members relationship (including edge 355) to user vertex 360 of FIG. 3.

The example graph of FIG. 5A and schema excerpts of FIG. 5B illustrate a variation on FIG. 3, as applied to reporting relationships. Since graph management 170 includes a schema interpreter, it can be applied to the broad range of classes/configurations of objects, properties/attributes, and so on for different use cases, constraints, interactions, etc. Graph management 170 is also capable of using redundancy in the schema to detect and resolve some schema deficiencies, as illustrated in the following example.

Example graph 173 of FIG. 5A represents manager-team relationships that appear in organization charts, overlaid on the user-role-assignment graph. Similar graph overlays can also represent other inter-relationships among user vertices and/or other objects. The schema for graph 173 defines properties/attributes for implementing such relationships and for notifications between the objects. Sufficient notifications will provide for notification of updates to the vertices/edges and/or topology (e.g., that might alter the reporting structure) can be propagated between a manager and reports, or among objects in other inter-relationships (e.g., within the same class of vertices), so that effective attributes can be correctly recalculated. Thus, such changes can not only be refreshed in a cache maintained, for example, at each user vertex in such an inter-relationship. Updates for other inter-relationships can also be stored in the same cache. The caches for such inter-relationships can also be the same caches that are maintained at a class of vertices in another use case (e.g., user vertices in the user-role-assignment use case depicted in FIG. 3). In one of the example schemas, the set of managed users that define the manager/reports relationship, and the roles and assignments also part of this graph topology—all of this vertex/edge state is stored in the repository. The 'cache' of graph topology state can be implemented as a property, defined on one or more of the vertex classes (e.g. effectiveRoles or effectiveAssignments) that encapsulate state corresponding to the graph topology connected to a particular vertex. This property can be persisted in the repository along with other vertex properties. It can be considered a 'cache' because it avoids the need to explicitly traverse the graph topology to respond to a query for effective assignments, which was necessary before development of the technology disclosed. A different cache can also be used. Thus, while the example schema does not implement a never stale cache of ultimate reports, such a cache could also be readily added to, for instance, the top n layers of a hierarchical reporting structure.

A reporting relationship can be illustrated as user vertices connected by relationship pairs, sometimes termed multigraphs, plus any applicable properties or other attributes, as in FIGS. 3 through 4B. In the FIG. 5A example and the FIG. 5B schema, user vertex 360 is defined (beginning at line 0663) as being connected by a "manager" relationship 550, which is described as "Manager" at line 0669. Lines 0666-0667 identify the paired reverse relationship "reports". Additional information is also given by an "_id" property at line 0684. A query is (incompletely) described beginning at line 0695.

Complementary to the manager relationship is the "reports" relationship 555 at line 0474, described as "Direct Reports" at line 0476, with the paired reverse relationship "manager" at lines 0487-88. Additional information is also given by an "_id" property at line 0485.

A manager (e.g., a developer Boss) represented by user vertex 596 has one or more direct reports (e.g., a developer represented by user vertex 360), and the developer user is a direct report of the developer boss user. It will be appreciated that other users can report to boss 596 and/or the boss can report to one or more higher ranking bosses. Other manager-report relationships can be represented in a similar manner.

Graph 173 can also, for example, represent support or other inter-relationships, in addition to assignment/permission and manager-reporting relationships. In FIG. 5A, 584 is a roles property that points to instances of role vertices. A role vertex is connected by relationship 585 to a user vertex 360 and, in the other direction, by a pair of relationships 530, 535 to a user in an administrative role 592 (an example functional inter-relationship). FIGS. 5A and 5B do not call for never stale caching, but circumstances could lead to use of caches, which the technology disclosed supports.

The FIG. 5A example includes notifications 580 that extend beyond the schema, and are not present in the schema shown in FIG. 5B. According to notifications 580, updating an attribute of one user who reports to or supports other users and updating topology of graph 173 for the user, triggers notification of the update to the other user(s) in the reporting inter-relationship(s). In this example, notifySelf and notify have to do with signaling dispatch when edges are manipulated (created/deleted/updated). Given managed users managed/user/developer 360 and managed/user/developer_boss 596, you can create an edge between the two in two ways. First, by a POST against managed/user/developer/manager with a payload of {"ref": "managed/user/developer_boss"}. Or, second, by a POST against managed/user/developer_boss/reports with a payload of {"ref": "managed/user/developer"}. notifySelf will notify the vertex identified in the URL of the rest request: managed/user/developer in the first approach, and notify managed/user/developer boss in the second approach. Thus, the edges between vertices have their own rest endpoints. When they are manipulated, signals can be sent to 0-2 vertices, as dictated by notifySelf and notify. notifySelf will notify the vertex referenced in the URL of the request, and notify will notify the vertex referenced in the invocation payload. Thus, for the first approach, if a notify is on the manager relationship field, the vertex referenced in the invocation payload—i.e. managed/user/developer_boss—will be signaled. For the second approach, if notify is on the reports relationship field, then the vertex referenced in the invocation payload—i.e. managed/user/developer—will be signaled. Thus notify and notifySelf have to do with which vertices to notify whenever a given edge is updated; notifyRelationships dictates that notifications will be signaled out of a given relationship field when vertex state is manipulated. NotifySelf for Boss user vertex 596 and developer user vertex 360 means that an update to user vertex 596 (boss) triggers a notification along reports relationships 555 (lines 0474-5 of schema excepts 177d in FIG. 4B) to vertices of boss's reports (including developer user vertex 360). NotifySelf of user vertex 360 means that an update to developer user vertex 360 triggers an update notification along manager relationship 550 to boss user vertex 596 (line 0487-8). NotifyRelationships and notify:true at (developer) user vertex 360 further propagates the notification of the update to (Boss) user vertex 596 via role relationship 530 to (admin) vertex 592 (line 0358 of FIG. 4A), and notifySelftrue at admin vertex 592 similarly triggers notification of an update to (admin) user vertex 592 to propagate via members relationship to (developer) user vertex 360. Other relationships as among user vertices and/or among other vertices of graph 173 can also be similarly defined and implemented.

Having described a basis for operation of schema interpreter 175 and graph manager 180 (FIG. 2) in configuring notification requirements (including never stale cache requirements) from a schema, and detecting and initiating a response to updates, we will now discuss refreshing effective attributes in greater detail, beginning with FIG. 6.

Figure 7:
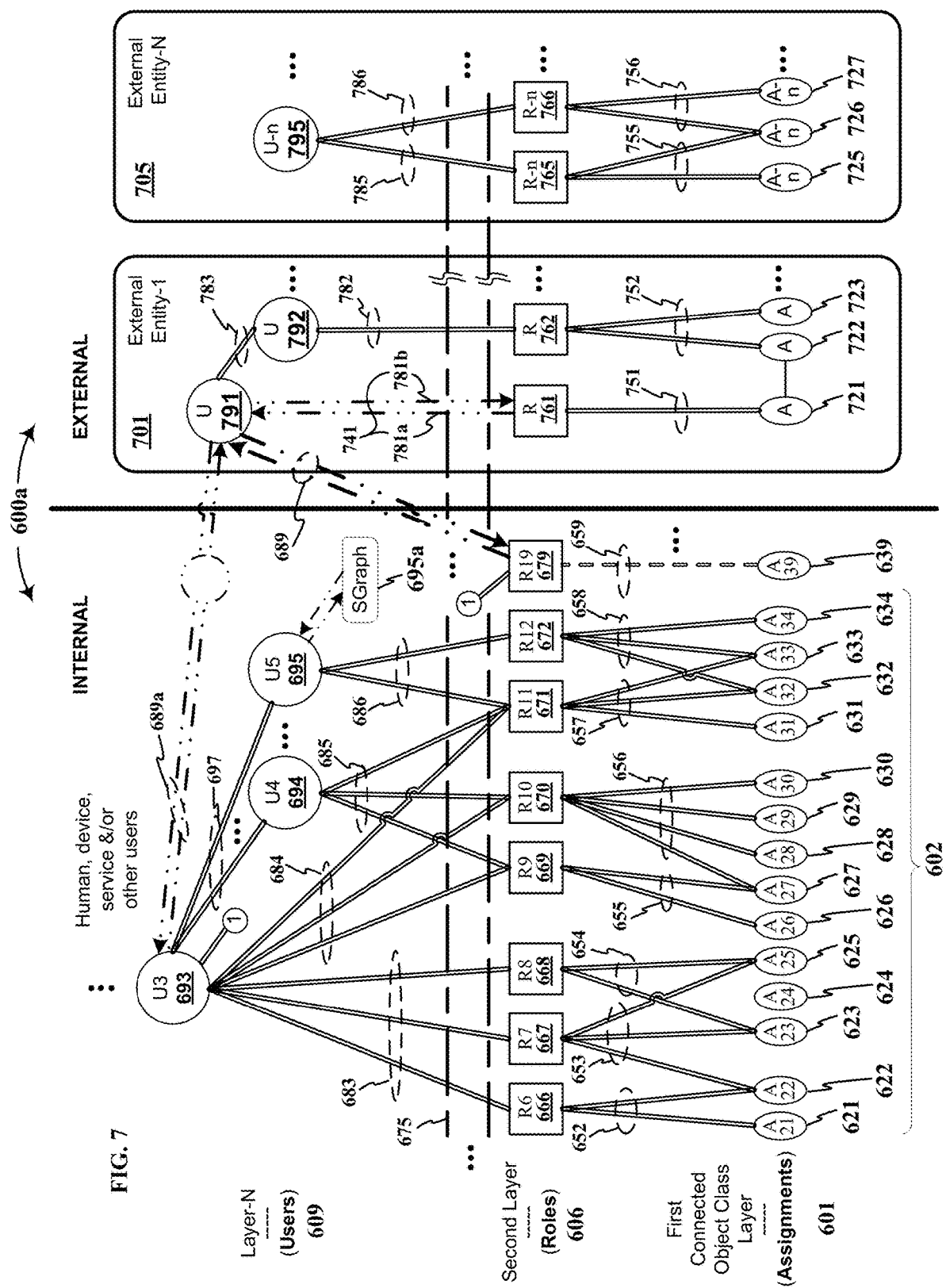
FIG. 7 adds to FIG. 6 conditional relationships and relationships to external connections.

FIGS. 6 and 7 illustrate example graphs with three vertex class layers and multiple nodes connected by edges, some of which apply conditions to relationships. FIG. 6 shows an example graph example in a user-role-assignment use case. FIG. 7 adds conditional relationships and relationships to external connections. Extending the primary use case, graph 600 is illustrates three classes of vertices from the user-role-assignment use case and its schema. As explained, a user update to an attribute of an assignment vertex will trigger a notification from the assignment vertex to one or more user vertices. For example, modification of A1 611 produces a notification that effectively propagates along 642a1 to R2 662 and along 681a1 to U1 691. Modification of A32 632 produces a redundant notification, based on propagation via role vertex R11 671 to user vertices U3-U5 693-95 and via role vertex R12 672 redundantly to user vertex U5 695. As in previous examples, the update is detected by graph management 170, which traverses graph 600 to produce notifications in one direction and cache recalculations in the opposite direction. Refreshing includes recalculating aggregated effective attributes, which are stored in the never stale cache at a user vertex in this example. Refreshing can involve executing the query of 0547 (FIG. 4A), for example, which would in this case return effective attributes by traversing role vertices R1-R5 661-5. Executing the refresh query for U1 691 would aggregate effective attributes from assignment vertices A0-A9 610-19.

A wide variety of graphs can be defined using the schema and other technology disclosed. Graph 600 is not limited to three layers of vertex classes, and can include fewer or more layers of vertex classes. Likewise, schema interpreter 175 identifies, from the schema, classes of objects for which notifications are triggered or are otherwise required, edges to trace, and the class(es) of edges to which they connect in conjunction with other of the discussed graph management 170 operation. Graph management will similarly operate according to a schema that defines variable classes of vertices and edges as well as different intra-class relationships, to different cache configurations, and to different requirements. Thus, an update applied to a vertex attribute will more generally trigger a notification that propagates from the updated vertex, along one or more connected edges to one or more connected user vertices for each intermediate class of vertices, and along one or more connected edges to one or more user vertices.

Graph management 170 can create, maintain, evaluate and compile/notify respecting such caches, among other graph management features. A user update to a leaf vertex attribute will generally trigger a notification that propagates from the updated vertex, along one or more connected edges to one or more connected user vertices for each intermediate class of vertices, and along one or more connected edges to one or more vertices in one or more target classes of vertices, according to a schema. A target class of vertices can, for instance, include a class of vertices or target vertices at which never stale caches are maintained. Thus, refreshing can also be generally described as traversing along one or more connected edges to one or more connected vertices in an intermediate class of vertices, and along one or more connected edges to one or more target classes of vertices (e.g., in a class of vertices at which never stale caches are maintained), among other examples. This is a conceptual description, as the graph can be implemented in a relational database which uses rows in tables to represent nodes and edges or in a graph database.

The composite graph 600*a* of FIG. 7 illustrates additional examples of features usable in conjunction with schema 173*a-d* or another schema. Graph 600*a* of FIG. 7 extends the right hand side of FIG. 6 to indicate examples of graph objects that can be conditionally updated or further processed by graph management 170.

In a first example, graph management 170 (FIG. 1) can implement temporal and/or other conditions on effectiveness of relationships. In this illustration, internal versus external labeling is applied from the perspective of managed computing services 105 of FIG. 1. Internal services are those provided by managed computing services 105, or further, by organization network services 102 provided by the organization of FIG. 1 subject to identification management provided by managed computing services 105. External services can, for example, include managed computing services provider 105 redistributing services provided by a partner, contractor, as an actual/potential customer and/or according to some other relationship of a user or organization (e.g., 701, 705) with managed computing services 105 and/or organization network services 102. Managed computing services 105 (or further, organization network services 102) can also consume the external services of an external service provider and/or provide services to the external service provider, and managed computing services 105 can provide identification management services in conjunction with other internal/external services.

Consider a contractor, represented by user vertex 791, which is subject to a contract to provide maintenance of equipment of managed computing services 105. Graph management 170 (e.g., graph compiler) provides for temporal and/or other conditions, supported by the schema, under which the contractor assumes a role that carries with it assignments/permissions related to the contract. The role or more than one role can be created in graph 600*a* for providing the contractor user with access to equipment and information that is temporally or otherwise conditioned. "TemporalConstraints" and "conditionalAssociation" are introduced in the schema excerpts at lines 0991 and 0875, 0983 FIG. 4B. For example, suppose today a day in January and the effective period of the contract for the contractor's services is March 15 through April 15. A temporal condition defined by the schema of graph 600*a* can be placed on the contractor's role relationship, connects the contractor's user vertex 791 to role vertex R19 679, or an attribute of the role vertex, under a different schema. Temporal conditions are evaluated daily. On March 15, a notification is generated because the temporal condition is met. The effective attributes of the contractor's user vertex 791. On or after April 16, another notification is generated, the contractor no longer has access to the role and all effective attributes are lost. Until March 15, while the temporal condition remains unmet, the contractor's role (represented by role vertex R19 679) is not yet effective, and calculation of effective attributes does not traverse (and excludes) role vertex from updating R19 and A39 639. This effectively nullifies the relationship of user 791 through role R19 679 and along relationship 689 to assignment A3 for graph management refreshing purposes while the condition remains unmet. The temporal condition is satisfied from March 15 to April 15, and graph manager 170 accumulates temporary effective roles and assignments for R19 and A39 in never stale caches. Refreshing of never stale caches for user vertex 791 (as well as R19 and A3 vertices) proceeds among other refreshes. The schema can also provide for other conditions (e.g., that the contract is effective and was not, for example, rescinded) in conjunction with the temporal conditions (and/or each other). In such cases, any one of the other conditions being unmet can also cause graph manager 170 to conduct refreshing without traversing R19 or A39. In a further example implementation, a reporting relationship is created between user vertex U3 693 and U 791 (that is applicable to an external user via an external user vertex or provisioning of an internal user vertex representing the contractor/according to the contract) or U3, that is also connected to R19, and is charged with updating the condition(s) applicable to relationship 689. In yet another implementation example, a portion of notifications is not provided for and graph management 170 notifies one or more impacted users (e.g., user U3 693), for instance, as with the reporting example of FIGS. 4A-B. In implementations where graph management 170 also stores update history, analytics and/or other information, such other information can but need not be stored in never stale caches and can be refreshed and retrieved accordingly, e.g., by graph management 170.

Graph management 170 recalculation can include replacing attributes in a never stale cache with recalculated effective attributes replaces only attributes for which effective attributes are recalculated. Graph management 170 can conduct refreshing according to different conditions that can be compared, supersede or otherwise impact whether the temporal condition or other conditions are treated as met or unmet, whether respective transitions/states should be applied as updates, and so on. For instance, relationship 698*c* in FIG. 6 can provide that a user ("Boss") represented by user vertex U3 693 has a reporting relationship 698*c* in which a user ("UM" or "Upwardly Mobile") represented by user vertex U5 695 (UM) is a report of Boss, who is UM's manager (e.g., as with FIGS. 4A-B). U5 695 also has a reporting relationship 698*p* with a user vertex representing a potential "new Boss" (not shown). Reciprocal conditions on relationships 698*c* and 698*p* further implement that, on the happening of an event, status or some other indicated condition, e.g., completing a project, maintaining sales, teaming, etc., UM will be re-assigned from Boss to new Boss. That is, the currently met condition on relationship 698*c* for U5 remaining a report of U3 will no longer be met and the currently unmet condition on relationship 698 of U5 being a report of new Boss will be met. Similar conditions can also be applied to one or more relationships connecting U5 with current role vertices (e.g., R12 672) and/or new role vertices (not shown), current/new functional inter-relationships and so on. Graph management 170 refreshing does not traverse relationships with unmet conditions and therefore does not accumulate effective attributes over paths that are not effective. So effective attributes for user, role and assignment vertices conditionally connected according to UM's current job are recalculated but those connected to UM's future job are not currently accumulated. This arrangement is reversed when UM's reassignment to new Boss becomes effective.

One IDM implementation has a feature called conditional grantors/grantees. A given vertex class can, in its relationship definition, define a "conditionalAssociationField": "foo" in the referenced vertex class, where field "foo" in the referenced vertex class will define a condition which the referring vertex class must fulfill in order for an edge to be created linking the two. The vertex class defining the condition is the conditional grantor; the vertex class referencing this conditional field is the conditional grantee. The conditional grantor vertex, the role class, could define a field called foo whose contents would be 'workLocation equals San Francisco'. Assuming that the user class also defined a resourceCollection which referenced managed/role, and included "conditionalAssociationField": "foo", then edges between this role and a user would automatically be created whenever users are created whose workLocation attribute was San Francisco. This feature is a way to automatically create/delete edges between vertices. Temporal constraints on edges or vertices are honored during the calculation of effective attributes as specified in the referencedRelationshipFields in the queryConfig. Conditional grantors/grantees are a means to automatically create/delete edges between vertices, edges which may be traversed when calculating effective attributes.

In another example, graph management 170 refreshing includes recalculating effective attributes of objects subject to conditions (e.g., role vertices connected to UM's new job) when the state of the condition changes, as discussed for other user updates. Potential, users or end users could also include non-human users, and graph management 170 refreshing can be conducted according to "automatic" updates that change the state of a condition. Other examples also arise according to aspects of the present invention, including in conjunction with various use cases of identity management graphs and other graphs.

Cases may also exist in which one or both of internal service providers and external service providers seeks to utilize managed services of the other. In cases in which one service provider seeks access to the services of the other service provider, the service provider providing such access can act as a broker, for example, exercising control of role relationships of one or more roles vertices connected to one or more assignment vertices of the broker. The consuming service provider seeking to access services of the broker is a brokee. The broker can, for example, control access by controlling the status of the condition in such case (subject to contractual and other factors). In other cases, managed computing services 105 can also act as an intermediary for providing external services such as subscription services, consume media delivery, IoT sensing/storage services, and so on, among other examples. In still further cases, each of internal and external service providers can both provide services to the other (e.g., as broker for such services and/or cross-entity relationships) and seek access to services of the other (e.g., as brokee).

Figure 8A:
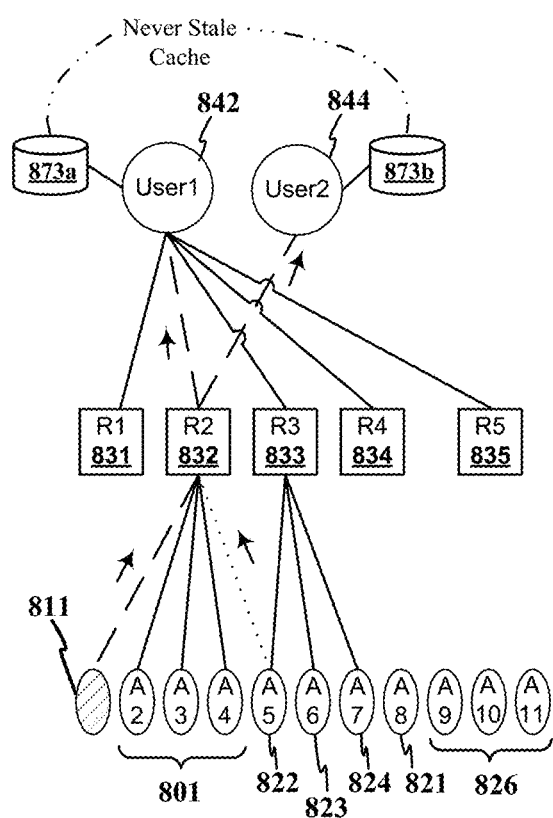
FIGS. 8A and 8B illustrate updates to a user-role-assignment use case graph at the assignment class layer of vertices.
Figure 8B:
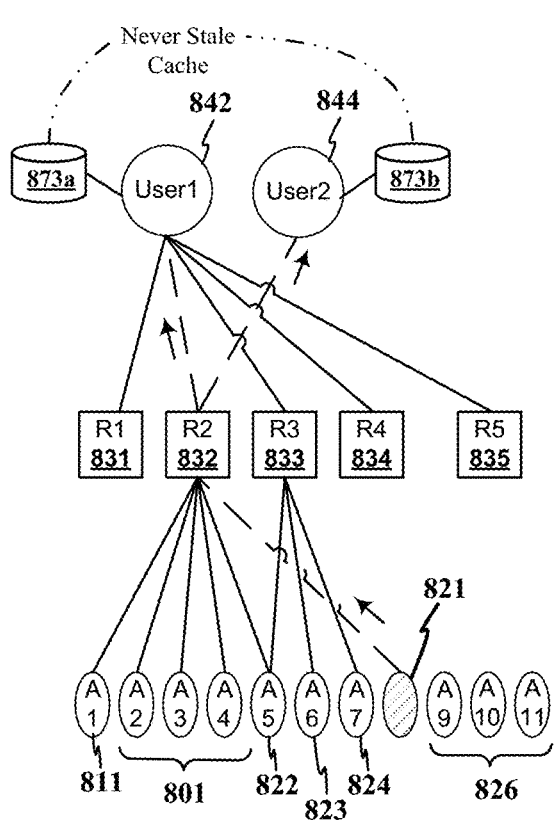
Figures 9A, 9B:
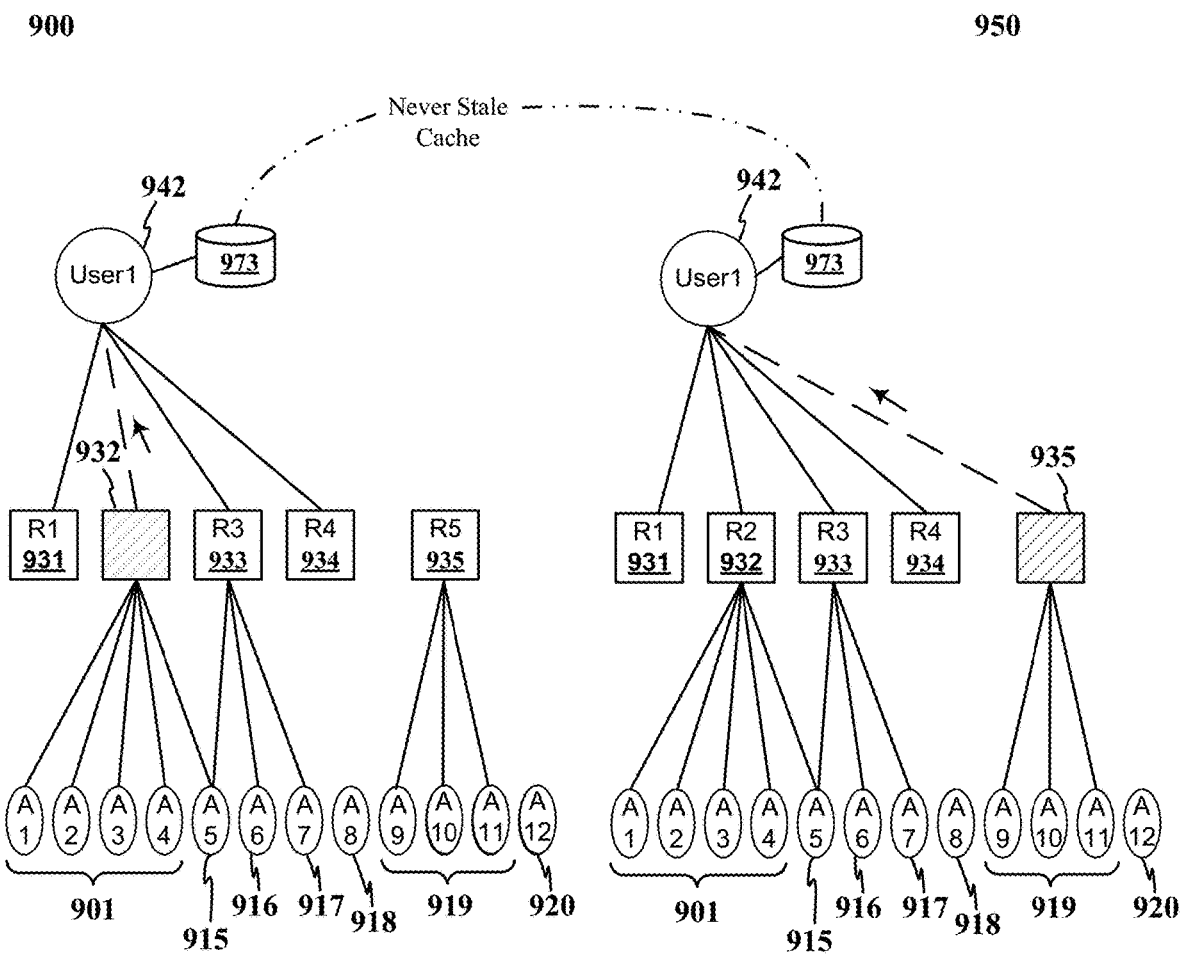
FIGS. 9A and 9B illustrate updates to a user-role-assignment use case graph at the role class layer of vertices.
Figure 10A:
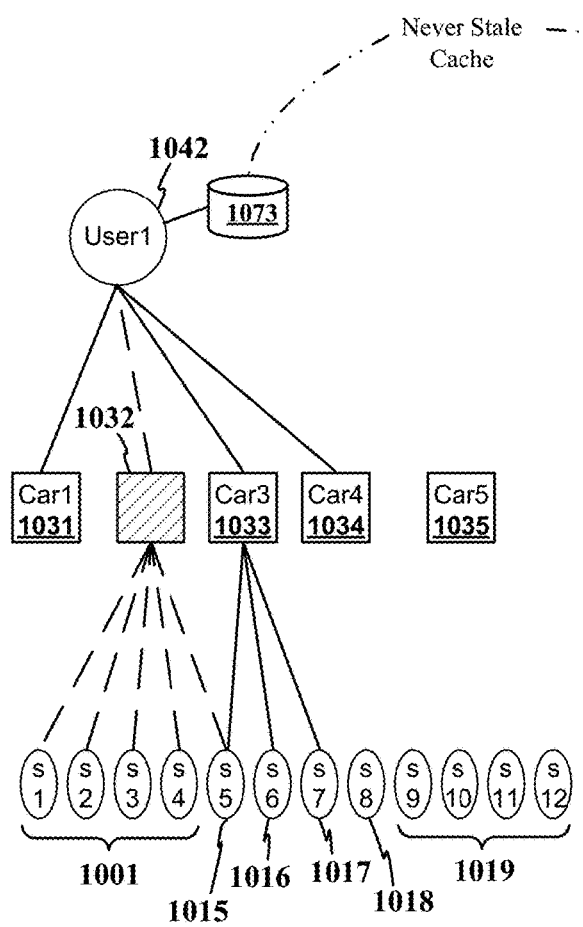
FIGS. 10A and 10B illustrate updates to an automotive feature and subscription example graph.
Figure 10B:
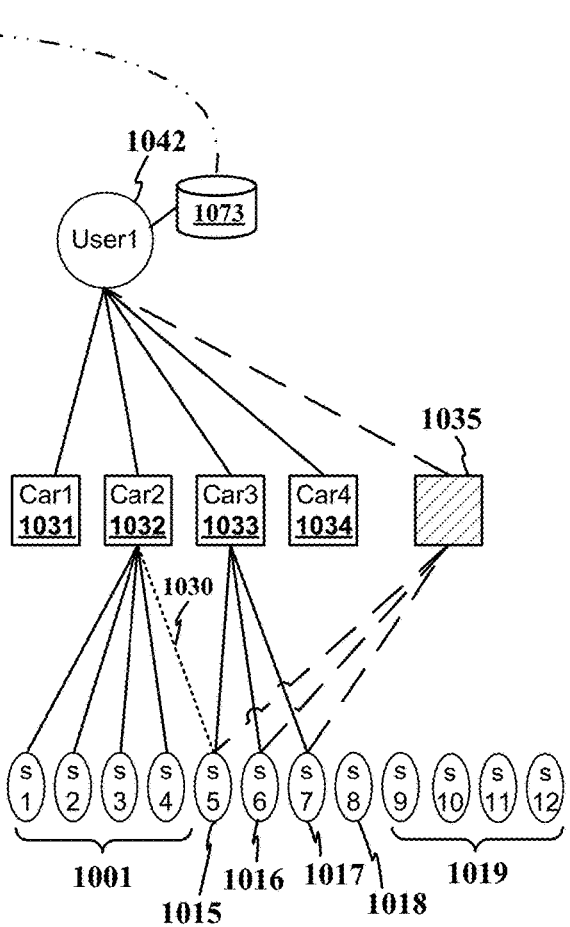

Several examples of updating attributes and topology at two levels of a graph are illustrated by FIGS. 8A through 10B. Pairs of examples illustrate the varying impact of updates at the same graph level. FIGS. 8A through 9B show example updates in a user-role-assignment graph, while FIGS. 10A-B show examples involving an automotive-related graph. The examples show how aspects of the technology disclosed enable computing resource, latency and other benefits to be achieved in conjunction with a broad range of customization, adaptation and updatability of identity management and other graphs. Depicted updates are made and schema interpreter 175, graph manager 180 and graph application 195 of graph management 170 operate in a similar manner as was already discussed.

In the figures, updated and/or impacted graph objects are indicated using shading for vertices and dashed/dotted lines for edges. Each edge represents a bidirectional relationship or relationship pair including a relationship and a reverse relationship. While references may be made to the specific schema 173*a-d* of FIGS. 4A-4B and 5B, it will be appreciated that aspects of the present invention are operable in conjunction with a wide variety of schema that can be utilized according to particular applications, for instance, as in FIGS. 6A-B and 10A-B.

FIGS. 8A-B have the same structure, graphs 800 and 850 including never stale caches maintained at the user class of vertices, including user1 842 and user2 844. The caches 873*a-b* resemble cache 373. Graphs 800-850 can include the same initial configuration of graph objects, and are used to explain graph management operation responsive to various user updates. Different numbering of like elements in FIGS. 8A-B and in subsequent use cases, such as caches 873*a* and 873*b*, is applied to figure pairs so that references to the elements will be clearly understood as the discussion progresses. Closed arrows indicate triggering and propagation of notifications.

FIG. 8A illustrates two examples of refreshing never stale caches on detecting user updates. Refreshing, in a general case, includes traversing the graph to aggregate effective attributes, while a special case enables a less resource intensive cache-based refreshing alternative. The schema discussed above provides instructions for how to refresh both effective roles and effective assignments when recalculation is triggered. Recalculation of effective assignments implicitly involves tracing effective roles, so the discussions of examples that follows only detail recalculation of effective assignments. In the following, the general case is applied to both user updates. A class of special cases is then considered, and cache-based refreshing is applied to applicable user updates to graph 800.

The first update changes an attribute of assignment vertex A1 811. The update triggers an update notification from A1 that propagates unidirectionally along all edges connecting A1 to role vertices and then along all edges connecting notification-receiving role vertices to connected user vertices. In this case, the notification propagates along a path from A1, along the dashed edges via role vertex R2 832 to user1 vertex 842 and user2 vertex 844. Graph management 170 detects the user update and refreshes the effective attributes at user1 and user2 vertices, storing recalculated effective attributes for each user in never stale caches 873a and 873b respectively.

Graph management 170 for refreshing caches, traverses graph 800 in the opposite direction of notification propagation. The traversal for user1 traces edges connecting user1 vertex 842 to role vertices, then traces edges connecting role vertices to assignment vertices. Recalculating effective attributes includes graph management 170 aggregating effective attributes of encountered vertices. Traversing role vertices in this case include vertices R1-R5 832-5. Graph management 170 also aggregates effective attributes for encountered assignment vertices connected to the encountered role vertices. These include, for R2 832, assignment vertices A1-A5 811, 801, and for R3 833, assignment vertices A5-A7, 822-4. No edges connect roles R1-R5 to remaining assignment vertices A8-A11 821 and 826 and no connecting edges remain to be traversed or encountered vertices to be queried. Graph management 170 recalculates the aggregated attributes for user1 842, replacing attributes stored in never stale cache 873a with recalculated effective attributes.

Refreshing of cache 873b at user2 vertex 844 for the first user update proceeds in a similar manner as with cache 873a of user1. Graph management 170 similarly traverses graph 800, tracing a path from user2, along edges connecting role vertices and assignment vertices, and along encountered edges, and again aggregates effective attributes by querying encountered vertices. For user2, graph management 170 aggregates effective attributes from connected role vertices of user2 (here, only R2 832) and from connected assignment vertices, here, before deletion of the dotted edge, A1-A5 (811 and 801). No further connecting edges remain to be traversed or encountered vertices to be queried. Graph management 170 therefore recalculates effective attributes for cache 873b, replacing attributes cache 873b with the aggregated and recalculated effective attributes, as with cache 873a. The newly stored effective attributes in never stale caches 873a and 873b represent the refreshed user1 and user2 vertices' views of the state of graph 800 for user1 vertex 842 and user2 vertex 844 respectively.

Moving on to the second update example in FIG. 8A, this update deletes a relationship (dotted edge) connecting assignment A5 822 and role R2 832. This user update triggers an update notification that propagates from the deleted edge or the leaf node connected to the deleted edge, along edges from assignment vertices to role vertices and from role vertices to user vertices (as with the first user update). Deleting the edge, when the locus of update is treated as the edge, triggers a notification that propagates from the deleted edge via vertex R2 832 to user1 vertex 842 and user2 vertex 844. Deleting the edge, when the locus of update is treated as assignment A5 822, triggers a notification that propagates from vertex A5 822 over the deleted edge via vertex R2 832 to user1 vertex 842 and user2 vertex 844 and also over the remaining edge via vertex R3 832 to user1 vertex 842. User2 must be notified, regardless, because user2 is no longer connected to A5. User1 may be redundantly notified when A5 is the locus of update.

Graph management 170 follows notification of the second user update deleting the edge with recalculation of effective attributes. Unlike the first update example, this second example changes the topology of graph 800 by deleting an edge. General case refreshing is again applied, and graph management 170 traverses graph 800 in a path along connecting edges from user1 and user2 to connected roles and connected assignments. Traversal leads to aggregating effective attributes queried from encountered vertices. Refreshing replaces attributes stored in respective user1 and user2 caches with the recalculated effective attributes. For user1 842, graph management 170 traverses graph 800 edges from user1 vertex 842 to role vertices, aggregating effective attributes for role vertices R1 832 through R5 835. Graph management 170 then traverses from role vertices to connected assignments, aggregating effective attributes of assignment vertices connected to ones of R1-R5, or in this case, for R2 (A1-A4 801) and R3 (A5-A7 822-4). The traversal in the case of user1 includes tracing the path from user1 842 via R3 833 to A5 822 that remains after the edge from R2 to A5 is deleted. (In more complex graphs, additional edges encountered during a traversal are themselves traversed, and effective attributes for encountered vertices are also aggregated, unless nullified, for example, by unmet conditions.) The same can apply to features defined in a schema using metadata (e.g., lines 0382, 0436, 0788 in FIG. 4A, 0856, 1141 in FIG. 4B and 0495, 0680 in FIG. 4B.) For instance, where metadata is used to create a second or further relationship pair connecting two vertices, or where a report/other relationship is defined in whole or part using metadata, additional edges encountered during a traversal are themselves traversed, and effective attributes for encountered vertices are also aggregated (unless nullified or otherwise impacted by a particular feature or features.) In this case, however, no edges connect role vertices R1-R5 831-5 to remaining assignment vertices and no further connecting/encountered edges remain to be traversed or encountered vertices to be queried. Graph management 170 therefore recalculates effective attributes, replacing attributes in cache 873a with the aggregated and recalculated effective attributes for vertices connected to user1 vertex 842.

For user2 vertex 844, which is not connected by a redundant path to assignment vertex A5 822 as with user1, graph management 170 traversal of graph 800 traces a path from user2 and aggregates effective attributes from role vertices connected to user2 (here R2 832). Traversing for user2 after deletion of the dotted edge also includes tracing a path from R2 to connected assignment vertices and is accompanied by aggregating effective attributes for the encountered assignment vertices, or in this case, A1-A4 801. No edges connect role vertices R2 832 to remaining assignment vertices and no further connecting/encountered edges remain to be traversed or encountered vertices to be queried. Graph management 170 therefore recalculates the aggregated effective attributes, replacing the cached attributes in cache 873b with the recalculated effective attributes (e.g., as with the first user update). Having applied general case refreshing in conjunction with both user updates to graph 800 for both of user1 and user2, alternative update implementation examples will now be considered.

The general case refreshing example applied above for user1 and user2 in conjunction with the two updates to graph 800, accounts for updates that change an object or edge attribute, as well as updates that change the topology of a graph by adding or deleting a vertex or edge. It also applies to highly diverse graphs, including graphs created/customized for widely varying use cases/scenarios and disparate identity management and other applications. The general case refreshing is broadly adaptable to such schema or in other cases in which specific changes/impact of a user update may not be (fully) known or readily apparent prior to refreshing.

Certain optimizations can be applied by carrying simple changes with notifications and by applying tree/subnet walking optimizations. When a unique attribute of a leaf node is changed, the change can be conveyed with the notification. The resulting difference to factored into recalculation of impacted caches is very simple, so the difference can be applied directly without repeating and reversing the graph traversal that determined which nodes were impacted and needed to be notified. This reduces the cost of recalculating effective attributes. When applying the general approach to accumulating effective attributes by walking a subgraph, joins from intermediate nodes can be executed on a depth first basis, so that two caches are refreshed in a single pass, to reduce traversal of the intermediate nodes In the user-role-assignment example, when the queryConfig elements are parsed, if the referencedRelationshipFields elements could be arranged in ancestor/descendant relationships (e.g. effectiveAssignments is a descendant of effectiveRoles, as calculating the former involves traversing roles/assignments, and calculating the latter involves traversing roles), the processing elements are arranged in such a way that the relationship fields do not have to be traversed redundantly. In other words, roles are not traversed(to calculate effectiveRoles), followed by the traversal of roles/assignments (to calculate effectiveAssignments), but rather the sequence roles/assignments are traversed once, and the attribute state from roles harvested to populate effectiveRoles as roles are traversed, followed by the traversal of the assignments relationship field as necessary to calculate effectiveAssignments. This avoids the redundant traversal of relationship fields. In pseudo code:

For example, assume a managed object defines four virtual properties, W, X, Y, and Z, and each are set by traversing the following relationship fields:
*W: a
*X: a/b
*Y: a/b/c/d
*Z: c/d Virtual properties W and X can be set while traversing the relationship fields necessary to set Y.

So the parsing of the schema can result in the creation of an object hierarchy which will require the traversal of the relationship field sequence a/b/c/d, and W will be set as a is traversed; X will be set when b is traversed following the traversal of a; and Y will be set when c/d are traversed following the traversal of a/b. The parsing will also generate the 'attribute harvesting' context to additionally traverse c/d in order to populate Z. The point is, that a/b will only be traversed once.

Other examples of potential optimizations will also become apparent in view of the technology disclosed and claims that follow.

In another special case, deleting a single edge disconnects a leaf node with unique attributes from the graph, completely, and has no other effect. This special case can be treated the same way as an update to a unique attribute of a leaf node, described above.

FIG. 8B illustrates a further graph management update to the initial user-role-assignment IDM graph of FIG. 8A in conjunction with a user update that adds an effective assignment for two users by adding an edge that changes the topology of the graph. To make references to FIG. 8B distinct, the graph is renumbered as graph 850. In this example, a user update adds an edge that connects assignment vertex A8 821 (which was previously a disconnected graph 850 object) to role vertex R2 832 and via R2 to user1 and user2 vertices 842, 844. Note that this user update changes graph 850 topology. The user update triggers an update notification by A8 that propagates in a connected path via connecting edges, from assignment vertex A8 to role vertex R2 832, and from R2 to connected vertices user1 vertex 842 and user2 844. Graph management 170 can apply general case refreshing for both user vertices. Graph management 170 traverses roles, then assignments and then any relevant encountered edges (e.g., that are relevant and not nullified by unmet conditions). Traversing includes accumulating effective attributes for user1 842 and user2 844 (at which never stale caches 873*a*-*b* are respectively maintained). For clarity sake, the traversal of graph 850 is considered separately for user vertices 1-2, although alternatively, graph management can conduct a combined traversal for user vertices 1-2.

For user1 842, graph management 170 general case refreshing traverses graph 850 along connecting edges in the opposite direction of notification propagation from user1 to roles, then from roles to assignments, and then along encountered edges. The traversal aggregates effective attributes for role vertices R1 831 through R5 835. The traversal also aggregates assignment vertices connected by edges from role vertex including R2 832 (A1-A5, 811, 801 and 822) and from vertex R3 833 to assignment vertices A5-A8, 822-24, 821. The two sets of effective attributes for R5 reflect the redundant path from user1 via R3 to A5, and the aggregated effective attributes reflect a new effective assignment A8 of the user1 vertex. Role vertices R1 and R4-R5 831, 834-835 are not connected via edges to further assignments and there are no further encountered edges or effective attributes from other vertices to aggregate. Graph management 170 therefore recalculates the aggregated effective attributes, including replacing attributes in cache 873*a* with the recalculated effective attributes (e.g., as in the previous use case examples).

For user2 844, graph management 170 general case refreshing traverses along edges from user2 via roles to assignments, and then along encountered edges, and aggregates effective attributes for encountered vertices. In this case, aggregated effective attributes include effective attributes for role vertex R2 832 and assignment vertices connected via edges to R2 832 (A1-A5, 811, 801, 822 and A8 821). User2 is not connected by edges to other roles or assignments and no further encountered edges or vertices remain. Graph management 170 therefore recalculates the aggregated effective attributes, including replacing attributes in cache 873*b* with the recalculated effective attributes, and cache 873*b* reflects the new effective assignment A8 821 of user2 844.

FIGS. 9A and 9B illustrate refreshing of a never stale cache resulting from updates to roles instead of assignments, to intermediate vertices instead of leaf vertices.

FIG. 9A illustrates refreshing of a never stale cache maintained following a user update to an intermediate graph layer role vertex, as opposed to assignments in the bottommost layer. User1 vertex 942 can be in a class including further user vertices. User vertex 942 is along a path connected with the user update to the role R2 vertex attribute.

General case refreshing is first applied in conjunction with graph management 170 detecting the user update and initiating traversal of graph 900 that traces a path in a direction opposite notification propagation. In this case, the user update triggers notification from role vertex R2 932 that propagates along the edge connecting R2 and user1. (Note that, while schema 177*a*-*d* defines unidirectional propagation, other schema can alternatively provide for bidirectional propagation, i.e., from role2 to user1 and also to assignment vertices or other propagation of notifications. In such cases in which notification propagation occurs in both directions, general case refreshing can veer from the more typical case of traversing the graph in the direction that of notification propagation.) Graph management 170 general case refreshing for the first user update traverses along edges to connected roles, then connected assignments and then encountered edges, accumulating effective attributes. Traversal is accompanied by aggregating effective attributes from encountered vertices as in the previous examples. In this case, graph management aggregates effective attributes for role vertices R1 931 through R4 934 and assignment vertices connected by edges from vertex R2 832 (A1-A5, 901, 915) and R3 (A5-7, 915-917). The aggregated effective attributes including repeated effective attributes for A5 along the redundant path from user1 via role R3 to assignment A5 is resolved as in the previous example. Role vertices R1 931 and R4 934 are not connected via edges to assignments and role vertex R5 935 is not connected by an edge to user1 vertex 942. There are also no further encountered edges to traverse or encountered vertices to query. Graph management 170 therefore recalculates the aggregated effective attributes, including replacing attributes in cache 973 with the recalculated effective attributes.

For completeness, we describe sections of the schema that describe refreshing of effective roles, having previously discussed sections of the schema related to refreshing effective assignments. In schema 177a, which defines the schema for user vertices (line 0004) including user vertex 942, querying applicable to roles 931-934 is defined at line 0530, "queryConfig"; {, and 0531, "referencedRelationshipFields": ["roles"], and references "effective role items" at line 0537. The query provided by the schema for roles 931-934 and not the attributes for roles, which could be accumulated in a different use case. The schema definition of queryConfig includes referencedRelationshipFields, which indicates the relationship fields to traverse to reach the terminal vertex types from which to harvest attributes. The referencedObjectFields configuration is optional, and, if present, specifies the fields in the terminal vertices to include in the calculated attributes. If the referenceObjectFields are not specified, then the edge state pointing to these terminal vertices is included in the calculated attribute. Thus, the effectiveRoles property on a managed user will contain the edge state pointing to the roles a given user has. The following JSON represents effectiveRoles and effectiveAssignments state for a user which has the admin role, and the admin role has a single assignment, called assignmentOne:

```
"effectiveAssignments": [
  {
    "_rev" : "00000000b10a664e",
    "_id": "d9523073-4d88-43ce-b6a7-7b5a6da161a3",
    "name": "assignmentOne",
    "description": "an example",
    "mapping": "managedRole_managedUser"
  }
],
"effectiveRoles": [
  {
    "refResourceCollection": "managed/role",
    "refResourceId": "admin",
    "ref": "managed/role/admin"
  }
]
```

The 'edge state' is simply information identifying the referred-to vertex: the _refResourceCollection is the vertex class, the refResourceId is the vertex identifier, and the _ref is the catenation of the two.

These attributes can be contrasted with those for effective assignments beginning at line 0540 for which querying beginning at line 0547 provides a querying configuration, "queryConfig": {. This query configuration instead provides for field information ("referencedRelationshipFields ["roles", "assignments"], at line 0548) as well as a wildcard for querying object field states ("referencedObjectFields: ["*"], at line 0549. In this instance, the schema provides for aggregating effective attributes of assignment vertices A1-A4 901 and A5-7, but only accumulates an array of pointers to connected role vertices, not attributes of the role vertices.

FIG. 9B, illustrates refreshing of a never stale cache maintained at a user vertex of an IDM graph responsive to or in conjunction with a user update that, after adding an edge that connects user1 to a role vertex having connected assignment vertices. In this example of an added role edge, the user update will trigger a notification from role 935 that propagates via the new edge to user1 942, and if provided by the schema, to assignments A9-11 919 as well. Assuming the schema 177a-d is resolved (e.g., as in FIG. 9A), graph management 170 general case refreshing will traverse 950 along edges from user1 942 to connected roles R1-R5 931-935 and aggregate effective attributes from encountered vertices. Refreshing will then traverse along edges to assignments 919 and aggregate effective attributes from encountered vertices connected to R2 (A1-5, 901, 915), R3 (A5-7, 915-17) and R5 (A9-11, 919) as well as from traversing encountered edges to encountered vertices. In this case, since R1 931 and R4 934 are not connected to assignments and no further encountered edges remain, graph management 170 will recalculate aggregated effective attributes, including replacing attributes in cache 973 with recalculated effective attributes. Moreover, graph management alternatives implementing special case refreshing will determine that the added edge adding role and assignment vertices changes graph 950 topology, is not well defined and is not subject to special case refreshing by querying cache 983 instead of traversing graph 950. Never stale cache 983 will reflect the new effective assignments A9-A11 919 for user1 942.

FIGS. 10A and 10B are automotive related prophetic examples. With such examples, we disclose potential application of this technology to graphs that can include non-human user and/or other vertices, and graphs that can utilize non-human interaction and/or other operational factors as well. In FIGS. 10A-10B, the apex layer is a car owner, the middle layer is a car that has an operating system on which features and subscriptions depend, and the bottom layer is features and subscriptions. The car owner owns different cars from time to time. The car operating system is updated periodically. The owner occasionally migrates features and subscriptions from an old car to a new car.

In FIG. 10A, an operating system attribute of car 1032 is updated. Instead of triggering upward notifications, it triggers downward notifications for the features and subscriptions to check for compatibility updates, responsive to the OS update. This is an example of notifications flowing downward through layers, instead of upward.

FIG. 10B illustrates migrating subscription services to the new car, from 1033 to 1035. In a subsequent step, not shown, the old car3 1033 would be removed from the graph, perhaps conditionally at the end of a subscription month. In this, example, one or two notifications of user1 1042 would happen, depending on whether the subscriptions were linked to the new car before or after the new car was linked to the user. Reflecting normal car buying, there can be a first notification when the car is connected to the user and one or more notifications as subscriptions migrate. Notifications trigger recalculation of user1's never stale cache of currently effective features and subscriptions, across the fleet. The user1 vertex 1042 in FIG. 10A represents a human user (i.e., a car owner). User1 vertex 1042 is connected along edges to car1-car4 (1031-1034) and the cars1-4 are connected along edges to respective ones of available subscriptions provided, for example, by a car dealer or one or more other subscription service supplier(s). Subsets of the subscriptions are therefore related via edges to ones of the user's cars (rather than the user) and respective ones of the cars are related via edges to the user. Subscriptions can, for example, include satellite radio, home electric car recharging, security and/or still other car-related features that might be provided. It is also a feature of graph 1000a that user updates can also flow downward with respect to the illustrated orientation of the graph, for example, to alert the subscription service supplier or suppliers of the user updates.

Suppose, alternatively, returning to FIG. 10A that car2 were simply deleted, thereby orphaning subscriptions connected along edges to car2. As in the previous examples of FIGS. 9A-B, the user update will trigger update notifications that propagate along edges connecting the cars vertices to user1 vertex 942. A never stale cache 1073 of available to use subscriptions is maintained at user1 vertex 1042. The user update triggers propagation of an update notification from car2 vertex 1032 along the dashed edge connecting the car1 vertex to user vertex 1032 and graph management 170 detects the update as in previous examples. Since the user update changes the topology of graph 1000a by adding a vertex, graph management 170 will operate according to the above-noted general case for graph management. Graph management 170 will traverse graph 1000a objects and accumulate effective attributes. Upon deletion of car2, graph management traverses edges along a path connecting user1 1042 with car1 vertex 1031 and car3 through car4 vertices 1033, 1034, querying and accumulating or aggregating available, usable effective attributes responsive to the queries for each of car1 and car3 through car4 vertices. Graph management 170 further traverses edges connecting car 3 vertex 1033 to service vertices s5-s7 (1015-1017) and similarly accumulates effective attributes from service vertices s5-s7. Car1 vertex 1031 and car4 vertex 1034 are not connected via edges to services, car2 vertex 1032 is deleted, cars vertex 1035 is not connected by an edge to user1 vertex 1042, and there are no further relevant edges or effective attributes from other vertices to aggregate. Graph management 170 recalculates the aggregated effective attributes, including replacing attributes in cache 1073 with the recalculated effective attributes. The effective attributes in cache 1073 will also reflect that user1 no longer has effective services for car2 1032 or subscriptions unique to car2. Despite the different schema and insertion of a non-human car factor, the operation of graph management 170 readily extends various scenarios in FIGS. 10A-10B.

In the FIG. 10B example, the user replaces Car3 with Car5 and transfers subscriptions between cars. This update triggers notification propagation from car5 vertex 1035 along the edge extending from car5 to user1 1042, graph management 170 detects the update and the user date changes topology, so general case operation is again employed by graph management 170. Graph management 170 refreshes effective attributes, traversing graph 1000b along edges connecting vertices and aggregates effective attributes from vertices in response to queries by graph management 170 from cars1-car5 vertices 1031-1035 and then subscription vertices connected via edges to car2 (including s1-4, 1001), car 3 (including s5-7 1015-1017) and car 5 (including s5-7 1015-1017). Car1 1031 and car4 1034 are not connected along edges to subscriptions and graph management will not encounter further edges or effective attributes from other vertices to aggregate. Graph management 170 therefore recalculates the aggregated effective attributes, including replacing the attributes in never stale cache 1073 at user1 1042 with the recalculated effective attributes.

Downward flow from cars to subscriptions can be implemented by graph management 170, configured from a schema that, for instance, specifies maintaining never stale caches at a subscription class of vertices or in a system that implements other actions upon notification of a subscription vertex. A schema can also support other user-user relationships (e.g., as discussed with reference to FIGS. 4A-B) such as car dealers, subscription service providers, and so on. For instance, graph management 170 refreshing of effective attributes can be used in conjunction with a class of vertices in an additional consolidation-layer, Other examples will also become apparent in accordance with the technology disclosed.

Figure 11:
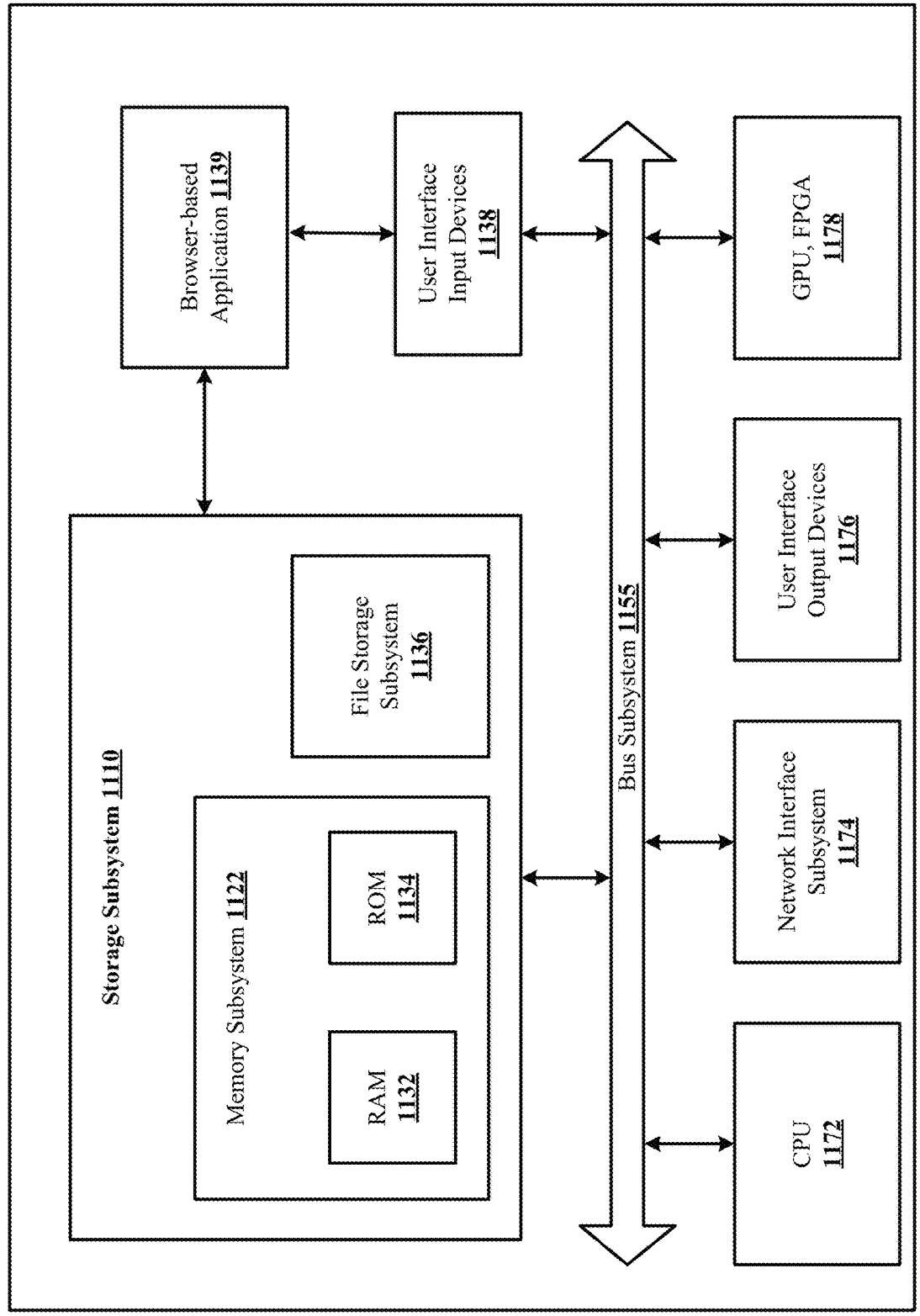
FIG. 11 is a block diagram of an example computer system that can be used for never stale caching of effective properties.

FIG. 11 is a block diagram of an example computer system that can be used for never stale caching of effective properties. Computer system 1100 includes at least one central processing unit (CPU) 1172 that communicates with a number of peripheral devices via bus subsystem 1155, and browser-based application 1139 for providing network security services described herein. These peripheral devices can include a storage subsystem 1110 including, for example, memory devices and a file storage subsystem 1136, user interface input devices 1138, user interface output devices 1176, and a network interface subsystem 1174. The input and output devices allow user interaction with computer system 1100. Network interface subsystem 1174 provides an interface to outside networks, including an interface to corresponding interface devices in other computer systems.

User interface input devices 1138 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1100.

User interface output devices 1176 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1100 to the user or to another machine or computer system.

Storage subsystem 1110 stores programming and data constructs that provide the functionality of some or all of the modules and methods described herein. Subsystem 1178 can be graphics processing units (GPUs) or field-programmable gate arrays (FPGAs).

Memory subsystem 1122 used in the storage subsystem 1110 can include a number of memories including a main random-access memory (RAM) 1132 for storage of instructions and data during program execution and a read only memory (ROM) 1134 in which fixed instructions are stored. A file storage subsystem 1136 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1136 in the storage subsystem 1110, or in other machines accessible by the processor.

Bus subsystem 1155 provides a mechanism for letting the various components and subsystems of computer system 1100 communicate with each other as intended. Although bus subsystem 1155 is shown schematically as a single bus, alternative implementations of the bus subsystem can use multiple busses.

Computer system 1100 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 1100 depicted in FIG. 11 is intended only as a specific example for purposes of illustrating the preferred embodiments of the present invention. Many other configurations of computer system 1100 are possible having more or fewer components than the computer system depicted in FIG. 11.

Some Particular Implementations

We describe various implementations of never stale caching in a graph that enables lookup of effective attributes on demand, without need to navigate the graph at the time of a query. The never stale cache is maintained as the graph is refreshed. Application of this technology to identity management graphs is described above. Of course, the technology has many additional applications.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A method implementation of a portion of the technology disclosed provides never stale caches of effective attributes in a graph, cached at a class of vertices. The same technology could be applied to caches at a class of edges, but this description focuses on caches at vertices. This method includes configuring, from a schema, notification requirements to be triggered by updating of attributes of vertices in the graph and triggered by updating a topology of the graph by updating (including adding or deleting) of vertices or edges in the graph. The configured notification requirements identify at least a direction of notification through the graph. On a directional basis, the configured notification requirement requires notifications to caching vertices connected to a locus of the update through the graph along the direction of notification. Caching vertices cache (or update their caches of) effective attributes harvested from vertices after the updating. Alternatively, the configured notification requirements can identify at least one class of vertices to be notified to refresh their caches. This class caches effective attributes that a vertex harvests or inherits from an updated vertex and other vertices. The configured notification requirement extends to vertices in the class that are interconnected in the graph to a locus of the update. An update is only likely to trigger notifications to a portion of the vertices in the class, because of the limited connections along the direction of notification between the update and the vertices in the class.

The method includes detecting an update to an attribute or topology in the graph that triggers the configured notification requirement and performing a notification of at least one vertex that is interconnected with the locus of the update. Responsive to the notification, refreshing the cache of effective attributes for at least one notified vertex. Refreshing includes recalculating the effective attributes stored in the cache based on effective attributes of the updated vertex and other vertices. The effective attributes can be accumulated by traversing or tracing edges beginning from the notified vertex. In some special cases, shortcuts can effectively traverse edges for effective attributes, when only one edge is impacted.

These method implementations for vertex and edge caches and for vertex and edge attributes and other methods disclosed can be used with one or more of the following features. This method can also include features described in connection with systems disclosed. In the interest of conciseness, alternative combinations of method features are not individually enumerated. Features applicable to methods, systems, and articles of manufacture are not repeated for each statutory class set of base features. The reader will understand how features identified in this section can readily be combined with base features in other statutory classes.

The technology disclosed can leverage specification of the cache refresh instructions in the schema. The method can include configuring cache refresh instructions from the schema. These instructions can include queries that effectively trace edges from the notified vertex, for instance by a query against a relational or key-value pair database or by tracing operations in a graph database, such as Neo4j.

Two use cases applied to different organizations of nodes and edges have been presented. In one use case, the graph is arranged with at least three classes of vertices. Notification traces from a third or subsequent class through a second class to a first class. In this case, the first class of vertices caches effective attributes. The refresh of the cache of effective attributes traces from the first class to the second, third or subsequent class. This pattern among three or more classes can be applied to users, roles and assignments.

In another use case, the graph is again arranged with a plurality of classes of vertices. In this case, edges interconnect vertices in a first class in a hierarchy with one or more root vertices. That is relationships are among vertices that are in the same class. Notification traces from leaf vertices or branching vertices that are updated up the hierarchy to the root vertices. The root vertices cache effective attributes. Refreshing the cache of the effective attributes can include tracing from a notified root vertex down the hierarchy. This approach can be applied to representing an organization chart or structure in a graph. Shortcuts for refreshing the cache can be applied in special cases of updating. These use cases can coexist in a single graph.

A single graph structure can apply never stale caching to one or more relationship structures. A vertex can cache more than one type of data. For instance, user vertices can cache both roles and effective assignments. The method can include tracing edges by querying for first degree vertices connected by first degree edges to the notified vertex. In this context, first degree refers to vertices connected by one edge to the notified vertex. When the notified vertex represents a user, the first degree vertices can represent roles. The cached effective attributes at a user vertex can be roles of the user. The method also can include joining from the first degree vertices to second degree vertices connected by second degree edges. Continuing with the notified vertex representing a user and the first degree vertices representing roles, the second degree vertices can represent assignments of rights. Then, the cached effective attributes can include assignments of rights available to the user. Assignments can be cached without necessarily caching roles. Refreshing the cache can be accomplished by a general case approach that always works or by special case approaches. In general, recalculating the effective attributes can always be accomplished by accumulating attributes from the updated vertex/edge and the other vertices/edges. This involves tracing from the notified vertex/edge across parts of the graph from which it harvests effective attributes. In some special cases, described above, notifications can include a description of an update to an attribute. In these special cases, refreshing the cache can use the description of the update, without tracing from the notified vertex/edge over the graph, because all the information needed accompanies the notification.

Refreshing the cache can be accomplished by adding a notified vertex to a list or queue of vertices needing a cache refresh. The list or queue can be used to refresh caches. Alternatively, notification can include iterating over one or more vertices that require cache refreshes and performing the cache refreshes as part of the iteration without an intervening list or cache.

As previously indicated, this same technology can be applied to caches that reflect effective attributes harvested from edges or relationships. This caching of effective attributes from edges can stand alone or be combined with caching effective attributes harvested from vertices. As applied to attributes from edges, the method includes configuring, from a schema, notification requirements to be triggered by updating of attributes of edges in the graph, including adding or deleting edges. The configured notification requirement, as above, identifies direction of notification and/or a class of vertices to be notified. Vertices to be notified cache effective attributes harvested from an updated edge(s) and/or vertices. The configured notification requirement can extend to vertices in the class that are interconnected in the graph to a locus of the update. The method includes detecting an update to an attribute that triggers the configured notification requirement. Then, performing a notification of at least one vertex that is connected with the locus of the update. Responsive to the notification, recalculating the effective attributes stored in the cache is based on effective attributes of the updated edge and other edges. The effective attributes can be accumulated by tracing edges beginning from the notified vertex. In some special cases, shortcuts can be substituted for tracing.

Any of the preceding methods and features can be applied to conditionally effective relationships. The conditions can be tied to timing or changed states or passage of milestones. Applied to an updated reporting relationship in an organization, or to a contractor with a temporary relationship to an organization, temporarily effective role, this method can apply a triggering data. Applied to a transfer within an organization, the method includes recording scheduling of a first user for a change in reporting relationship on a date, on which date the first user ceases reporting to a second user and begins reporting to a third user. Prior to the date, accumulating effective attributes ignores the scheduled reporting relationship with the third user when recalculating effective attributes. On the date, the method triggers a notification of vertices representing the second and third users to refresh caches of effective relationships. On and after the date, accumulating effective attributes ignores the prior reporting relationship with the second user when recalculating effective attributes. This processing of date-based conditions can be applied to a user joining an organization, as opposed to transferring within an organization. More generally, it can be applied to any graph in which an update is applied with a deferred effective date or time.

Applied to a milestone other than a date, the technology disclosed can be applied to recording scheduling of a first user for a change in new or temporary role upon reaching a milestone, at which milestone the first user receives or loses the temporary role. Prior to the first user receiving the temporary role, ignoring the scheduled new or temporary role when recalculating effective attributes. Upon first user receiving the new temporary role, triggering a notification of a vertex representing the first user to refresh caches of effective attributes. If the role is temporary instead of new, upon first user losing the temporary role, triggering a notification of a vertex representing the first user to refresh caches of effective attributes.

The technology disclosed can alternatively be described in a method implementation as providing a graph management component useful when a user is read, for avoiding any need to recalculate effective assignment in order to determine the effective assignment state of graph objects that control user access to services. The method is applicable and adaptable to highly diverse graphs in which a user can customize objects, configurations, operations, and features to meet different use cases as well as operational, relationship, transactional and other needs of individuals/organizations.

A method implementation of a portion of the technology disclosed provides a method of maintaining a cache of effective attributes in an identity management or other graph-based system. This method includes configuring, from a schema, notification requirements to be triggered by updating either attributes of vertices in the graph or by updating a topology of the graph, such as by adding or deleting of vertices or edges in the graph. The method can be implemented employing a schema extension that adds cache definitions, notifications, queries, and/or other schema elements, as well as object/class/edge traversing and other elements to operationally support cache refreshes. Such elements can be configured from the schema and utilized in detecting an update to a vertex, edge or graph topology, and in conducting cache refresh in response to or otherwise in conjunction with an update.

This method further includes that a configured notification requirement identifies a class of vertices to be notified as vertices that cache effective attributes harvested from an updated vertex and other vertices in a cache. Vertices in more than one class of caching vertices can also be utilized. The method further includes that the configured notification requirement extends to vertices in the class of caching vertices that are interconnected in the graph to a locus of the update, and extends to a cached vertex that is itself refreshed and the locus of the update. The vertices in the graph can be in a connected path connecting one or more of the caching vertices to the locus of the update according to one or more use cases represented by the graph, and updating can include connected vertices and edges according to such use case(s).

The method also includes detecting an update to an attribute or topology in the graph that triggers the configured notification requirement, and performing a notification of at least one vertex that is interconnected with the locus of the update. A method implementation can employ listeners to detect updates to attributes of a vertex or edge and to a change in graph topology by an update that adds or deletes a vertex or edge. The method can also propagate the notification along the connected path from the locus of the update to each cashed vertex in the connected path. The method also includes refreshing the cache of effective attributes for at least one notified vertex, responsive to the notification, traversing edges from the notified vertex to the updated vertex and other vertices, though shortcuts can effectively traverse edges more efficiently in special cases. This traversal of the graph typically occurs in a direction opposite the direction of propagation where the propagation of the notification is unidirectional. Edges encountered can also be traversed. The above method can also compile, from the schema, one or more cache refresh instructions for traversing the edges from the notified vertex, responsive the notification. The notification and traversing also provide redundancies in which a notification error can be overcome by traversing and caching that account for effective attributes to be cached at caching vertices, and visa-versa.

More use cases of the method above illustrate broad adaptability of the technology disclosed to different graph configurations. The graph can, according to schema object configurations, include different objects, numbers of layers and/or different or multiple use cases. In one instance, the graph is arranged with at least three classes of vertices. In that instance, notification propagates from a third or subsequent class through a second class to a first class, where the first class of vertices caches effective attributes, and the refreshing of the cache can traverse from the first class to the second class, third class or a subsequent class.

In one use case, the first, second and third classes, respectively, represent users, roles, and assignments. The classes can also alternatively or concurrently include one or more inter-relationships of ones of the users, roles and/or assignments. Another use case includes the graph arranged with a plurality of classes of vertices, in which edges interconnect vertices in a first class in an inter-relationship of vertices. In this use case, notifications traverse between the vertices in the first class or further connected vertices and/or edges, and each cached vertex caches effective attributes that account for changes to or impacting others in the inter-relationship. Refresh of the cache of the effective attributes thus traverse one or more other vertices in the inter-relationship. In another instance or third method, the graph is arranged with a plurality of classes of vertices with edges that interconnect vertices in a first class in a hierarchy with one or more root vertices. Here, notification traverses from leaf vertices or branching vertices up the hierarchy to the root vertices, the root vertices cache effective attributes, and refresh of the cache of the effective attributes traverses from a notified root vertex down the hierarchy. In more specific instance, the first class represents users and the hierarchy represents reporting relationships in an organization chart. In other instances, the classes can represent functional, conditional or other inter-relationships of user/other inter-connected vertices and/or edges in a same class.

Various update implementations, alternatives and optimizations can be applied with these methods. A first instance further includes traversing edges by querying for first degree vertices connected by first degree edges to the notified vertex. In an identity management implementation, this method can include that the notified vertex represents a user, the first degree vertices represent roles and the cached effective attributes are roles of the user, which can further include joining from the first degree vertices to second degree vertices connected by second degree edges. In further instances, this method can include that the notified vertex represents a user, the first degree vertices represent roles, the second degree vertices represent assignments of rights and the cached effective attributes are assignment of rights available to the user. The first method can also include traversing edges by executing graph traversing operations.

The first method can include, in all cases or general cases, recalculating the effective attributes by aggregating attributes from the updated vertex and the other vertices. It can also include, with some notifications, a description of an update to the attribute of the updated vertex and refreshing the cache using the description of the update. Other instances of the first method can further include performing the notification by iterating over one or more vertices that require the cache refresh and performing the cache refresh iteratively.

The first method can also include configuring, from a schema, notification requirements to be triggered by updating of attributes of edges in the graph. In such cases, a configured notification requirement can identify a class of vertices to be notified that cache effective attributes harvested from an updated edge and the configured notification requirement can extend to vertices in the class that are interconnected in the graph to a locus of the update. The detecting in such cases can include detecting an update to an attribute that triggers the configured notification requirement and performing a notification of at least one vertex that is interconnected with the locus of the update, and refreshing the cache can include, for at least one notified vertex, responsive to the notification, including traversing edges from the notified vertex to the updated edge to recalculate the effective attributes. The technology disclosed can also readily support cached edges as a class of edges at which caches are maintained, and multiple classes of vertices and/or edges can be caching vertices and/or edges.

The technology disclosed can also adapt, for instance, in optimizing refreshes, to temporal and/or other conditions that can be utilized together or separately in conjunction with one or more instances of a use case, multiple use cases or multiple instances of use cases where multiple use cases are represented by the graph. The first method and other method instances can include instances in which the graph is arranged with a plurality of classes of vertices, edges interconnect vertices in a first class in an inter-relationship of vertices. In such instances, notifications can traverse between the vertices in the first class, each vertex caches effective attributes, and refresh of the cache of the effective attributes traverse one or more other vertices in the inter-relationship. Such instances can further include recording scheduling of a first user for a change in reporting inter-relationship on a date, on which date the first user ceases reporting to a second user and begins reporting to a third user. Prior to the date, instances can include ignoring the scheduled reporting relationship with the third user when recalculating effective attributes, on the date, triggering a notification of vertices representing the second and third users to refresh caches of effective relationships, and on and after the date, ignoring the prior reporting relationship with the second user when recalculating effective attributes. Instances of the first method and other method instances can also include recording scheduling of a first user for a change in temporary role upon reaching a milestone, at which milestone the first user receives or loses the temporary role. Such instances can also include, prior to the first user receiving the temporary role, ignoring the scheduled temporary role when recalculating effective attributes, upon first user receiving the temporary role, triggering a notification of a vertex representing the first user to refresh caches of effective attributes, and upon first user losing the temporary role, triggering a notification of a vertex representing the first user to refresh caches of effective attributes. The first method and/or the other method instances can also include the configured notification requirement identifying, in an intra-class relationship of vertices according to a second use case expressed in the graph, a notification requirement for a notification that is unmet by the schema, detecting an update to an attribute or topology of the graph that is subject to the configured notification requirement identifying the intra-class relationship; and updating that communicates the notification to a first vertex in the intra-class relationship that is required for recalculating effective attributes for the first vertex. The technology disclosed also readily supports other optimizations using conditional vertices/edges, disconnected vertices/edges that can then be connected via update, process and do not process flags, and/or similar mechanisms to conduct refreshes that can ignore sub-graphs, other portions of a multi-domain graph, hidden changes, and so on.

A system implementation of the technology disclosed includes one or more processors coupled to memory. The memory is loaded with computer instructions that, when executed on processors cause the processors to implement a method of maintaining a cache of effective attributes in an identity management system employing a graph.

A first method implemented includes configuring, from a schema, notification requirements to be triggered by updating of attributes of vertices in the graph, and triggered by updating a topology of the graph by adding or deleting of vertices or edges in the graph. The method can be implemented employing a schema extension that adds cache definitions, notifications, queries and/or other schema elements, as well as object/class/edge traversing and other elements to operationally support cache refreshes. Such elements can be configured from the schema and utilized in detecting an update to a vertex, edge or graph topology, and in conducting cache refresh in response or otherwise in conjunction with an update.

This first method further includes that a configured notification requirement identifies a class of vertices to be notified as vertices that cache effective attributes harvested from an updated vertex and other vertices in a cache. Vertices in more than one class of caching vertices can also be utilized. The method further includes that the configured notification requirement extends to vertices in the class of caching vertices that are interconnected in the graph to a locus of the update, and extends to a cached vertex that is itself updated and the locus of the update. The vertices in the graph can be in a connected path connecting one or more of the caching vertices to the locus of the update according to one or more use cases represented by the graph, and updating can include connected vertices and edges according to such use case(s).

The method also includes detecting an update to an attribute or topology in the graph that triggers the configured notification requirement, and performing a notification of at least one vertex that is interconnected with the locus of the update. A method implementation can employ listeners to detect updates to attributes of a vertex or edge and to a change in graph topology by an update that adds or deletes a vertex or edge. The method can also propagate the notification along the connected path from the locus of the update to each cashed vertex in the connected path. The method also includes refreshing the cache of effective attributes for at least one notified vertex, responsive to the notification, traversing edges from the notified vertex to the updated vertex and other vertices in all cases. This traversal of the graph typically occurs in a direction opposite the direction of propagation where the propagation of the notification is unidirectional. Edges encountered can also be traversed. The above method can also compile, from the schema, one or more cache refresh instructions for traversing the edges from the notified vertex, responsive the notification. The notification and traversing also provide redundancies in which a notification error can be overcome by traversing and caching that account for effective attributes to be cached at caching vertices, and visa-versa.

More specific instances of the first method implemented account for the broad adaptability of technology disclosed to different graph configurations.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

System implementations of the technology disclosed include one or more processors coupled to memory. The memory is loaded with computer instructions executable by the processors to carry out any of the methods above, including combinations of methods with one or more features, extensions or options.

Other implementations may include a non-transitory computer readable storage medium storing instructions executable by a processor to perform functions of the system described above. Yet another implementation may include a method performing the functions of the system described above.

Other implementations may include a non-transitory computer readable storage medium storing instructions executable by a processor to perform a method as described above. Yet another implementation may include a non-transitory computer readable storage medium storing instructions executable by a processor that, when combined with suitable hardware, produce any of the systems described herein.

Reference to computer readable medium is not intended to refer to transitory signals carrying computer instructions executable by a processor, which are within the scope of the technology disclosed. When transitory signals are deemed patentable, they will be claimed as signals or downloads or some other form of data in motion, as opposed to data at rest.

We claim as follows:

1. A computer-implemented method of maintaining a cache of effective attributes in an identity management system employing a graph, comprising:

configuring, from a schema, notification requirements to be triggered by updating of attributes of vertices in the graph and triggered by updating a topology of the graph by updating vertices or edges in the graph, wherein the graph is hierarchically arranged with at least three classes of vertices, optionally representing users, roles and assignments;

wherein a configured notification requirement identifies at least a direction of notification through the graph and the configured notification requirement requires notification to vertices that are connected in the direction of notification through the graph with a locus of the update and that cache effective attributes harvested from vertices after the updating;
detecting an update to an attribute or topology in the graph that triggers the configured notification requirement and causes a notification that traverses from a third or subsequent class through a second class to a notified vertex of a first class that is connected with the locus of the update; and
refreshing the cache of effective attributes for the notified vertex, responsive to the notification, effectively traversing edges from the first class to the second and to the third or subsequent class to recalculate the effective attributes, wherein the effective attributes that express a relationship between the first and third or subsequent classes can be retrieved from the cache of effective attributes without traversing from the first to third or subsequent class.

2. The method of claim 1, further including:
configuring, from the schema, one or more cache refresh instructions for traversing the edges from the notified vertex, responsive to the notification.

3. The method of claim 1, wherein:
the graph is arranged with at least three classes of vertices, optionally representing users, roles and assignments;
notification traverses from a third or subsequent class through a second class to a first class;
the first class of vertices caches effective attributes; and
refresh of the cache of effective attributes effectively traverses from the first class to the second, third or subsequent class.

4. The method of claim 1, wherein:
the graph is arranged with a plurality of classes of vertices, wherein a first class optionally represents users and the hierarchy represents reporting relationships in an organization chart;
edges interconnect vertices in a first class in a hierarchy with a plurality of root vertices;
notification traverses from leaf vertices or branching vertices up the hierarchy to the root vertices;
the root vertices cache effective attributes; and
refresh of the cache of the effective attributes effectively traverses from a notified root vertex down the hierarchy.

5. The method of claim 1, wherein the notified vertex represents a user, first degree vertices represent roles, second degree vertices represent assignments of rights, and the cached effective attributes are assignments available to the user.

6. The method of claim 1, further including traversing edges by executing graph traversing operations.

7. The method of claim 1, further including recalculating the effective attributes by accumulating attributes from the updated vertex and the other vertices.

8. The method of claim 1, further including, with some notifications, a description of an update to the attribute of the updated vertex and refreshing the cache using the description of the update, thereby effectively traversing the edges from the notified vertex.

9. The method of claim 1, further including performing the notification by adding the notified vertex to a list or queue of vertices needing a cache refresh.

10. The method of claim 1, further including performing the notification by traversing over one or more vertices that require the cache refresh and performing the cache refresh as the traversing proceeds.

11. The computer-implemented method of claim 4, further including:
recording scheduling of a first user for a change in reporting relationship on a date, on which date the first user ceases reporting to a second user and begins reporting to a third user;
prior to the date, ignoring the scheduled reporting relationship of the first user with the third user when recalculating effective attributes;
on the date, triggering a notification of vertices representing the second and third users to refresh caches of effective relationships;
on and after the date, ignoring the prior reporting relationship of the first user with the second user and taking into account the reporting relationship with the third user when recalculating effective attributes.

12. The computer-implemented method of claim 1, further including:
recording scheduling of at least one first user for a change in temporary role upon reaching at least one milestone, at which milestone the first user receives or loses the temporary role;
prior to the first user receiving the temporary role, ignoring the scheduled temporary role when recalculating effective attributes;
upon the first user receiving the temporary role, triggering a notification of a vertex representing the first user to refresh caches of effective attributes; and
upon the first user losing the temporary role, triggering a notification of a vertex representing the first user to refresh caches of effective attributes.

13. A tangible non-transitory computer readable storage media, including program instructions loaded into memory that, when executed on processors cause the processors to implement a method of maintaining a cache of effective attributes in an identity management system employing a graph, the method including:
configuring, from a schema, notification requirements to be triggered by updating of attributes of vertices in the graph and triggered by updating a topology of the graph by updating vertices or edges in the graph, wherein the graph is hierarchically arranged with at least three classes of vertices, optionally representing users, roles and assignments;
wherein
a configured notification requirement identifies at least a direction of notification through the graph and
the configured notification requirement requires notification to vertices that are connected in the direction of notification through the graph with a locus of the update and that cache effective attributes harvested from vertices after the updating;
detecting an update to an attribute or topology in the graph that triggers the configured notification requirement and causes a notification that traverses from a third or subsequent class through a second class to a notified vertex of a first class that is connected with the locus of the update; and
refreshing the cache of effective attributes for the notified vertex, responsive to the notification, effectively traversing edges from the first class to the second and to the third or subsequent class to recalculate the effective attributes, wherein the effective attributes that express a relationship between the first and third or subsequent classes can be retrieved from the cache of effective attributes without traversing from the first to third or subsequent class.

14. The tangible non-transitory computer readable storage media of claim 13, further including:
configuring, from the schema, one or more cache refresh instructions for traversing the edges from the notified vertex, responsive to the notification.

15. The tangible non-transitory computer readable storage media of claim 13, wherein:
the graph is arranged with at least three classes of vertices, optionally representing users, roles and assignments;
notification propagates from a third or subsequent class through a second class to a first class;
the first class of vertices caches effective attributes; and
refresh of the cache of effective attributes effectively traverses from the first class to the second, third or subsequent class.

16. The tangible non-transitory computer readable storage media of claim 13, wherein:
the graph is arranged with a plurality of classes of vertices, wherein a first class optionally represents users and the hierarchy represents reporting relationships in an organization chart;
edges interconnect vertices in a first class in a hierarchy with one or more root vertices;
notification traverses from leaf vertices or branching vertices up the hierarchy to the root vertices;
the root vertices cache effective attributes; and
refresh of the cache of the effective attributes effectively traverses from a notified root vertex down the hierarchy.

17. The tangible non-transitory computer readable storage media of claim 13, wherein the notified vertex represents a user, the first degree vertices represent roles, the second degree vertices represent assignments of rights, and the cached effective attributes are assignments available to the user.

18. The tangible non-transitory computer readable storage media of claim 13, further including tracing edges by executing graph traversing operations.

19. The tangible non-transitory computer readable storage media of claim 13, further including recalculating the effective attributes by aggregating attributes from the updated vertex and the other vertices.

20. The tangible non-transitory computer readable storage media of claim 13, further including, with some notifications, a description of an update to the attribute of the updated vertex and refreshing the cache using the description of the update.

21. The tangible non-transitory computer readable storage media of claim 13, further including performing the notification by adding the notified vertex to a list or queue of vertices needing a cache refresh.

22. The tangible non-transitory computer readable storage media of claim 13, further including performing the notification by traversing over one or more vertices that require the cache refresh and performing the cache refresh as the traversing proceeds.

23. The tangible non-transitory computer readable storage media of claim 16, further including:
recording scheduling of a first user for a change in reporting inter-relationship on a date, on which date the first user ceases reporting to a second user and begins reporting to a third user;
prior to the date, ignoring the scheduled reporting inter-relationship of the first user with the third user when recalculating effective attributes;
on the date, triggering a notification of vertices representing the second and third users to refresh caches of effective attributes;
on and after the date, ignoring the prior reporting relationship of the first user with the second user and taking into account the reporting relationship with the third user when recalculating effective attributes.

24. An identity management system for maintaining a cache of effective attributes in a graph, the system including a processor, memory coupled to the processor and program instructions from the non-transitory computer readable storage media of claim 13 loaded into the memory.

* * * * *